(12) United States Patent
Akhavan-Tafti

(10) Patent No.: US 11,393,387 B2
(45) Date of Patent: *Jul. 19, 2022

(54) OPEN-CIRCUIT ELECTROLUMINESCENCE

(71) Applicant: AhuraTech LLC, Brighton, MI (US)

(72) Inventor: Hashem Akhavan-Tafti, Howell, MI (US)

(73) Assignee: AhuraTech LLC, Brighton, MI (US)

( * ) Notice: Subject to any disclaimer, the term of this patent is extended or adjusted under 35 U.S.C. 154(b) by 834 days.

This patent is subject to a terminal disclaimer.

(21) Appl. No.: 16/027,471

(22) Filed: Jul. 5, 2018

(65) Prior Publication Data

US 2020/0013329 A1 Jan. 9, 2020

(51) Int. Cl.
*G09G 3/32* (2016.01)

(52) U.S. Cl.
CPC ....... *G09G 3/32* (2013.01); *G09G 2320/0626* (2013.01)

(58) Field of Classification Search
None
See application file for complete search history.

(56) References Cited

U.S. PATENT DOCUMENTS

| | | | |
|---|---|---|---|
| 3,774,238 | A | 11/1973 | Hardway, Jr. |
| 4,434,657 | A | 3/1984 | Matsumura et al. |
| 4,991,150 | A | 2/1991 | Wixom |
| 5,187,979 | A | 2/1993 | Edmark, III |
| 5,627,522 | A | 5/1997 | Walker et al. |
| 6,104,107 | A | 8/2000 | Avramenko et al. |
| 6,501,846 | B1 | 12/2002 | Dickinson et al. |
| 6,606,399 | B2 * | 8/2003 | Burrows ............ G06K 9/00013 382/124 |
| 6,630,307 | B2 | 10/2003 | Bruchez et al. |
| 6,823,731 | B1 | 11/2004 | Lin |

(Continued)

FOREIGN PATENT DOCUMENTS

| | | |
|---|---|---|
| GB | 2218812 A | 11/1989 |
| KR | 101493310 B1 | 2/2015 |

(Continued)

OTHER PUBLICATIONS

International Search Report and Written Opinion dated Oct. 24, 2019 regarding PCT/US2019/040256.
Kumar et al. "A Review on Capacitive-Type Sensor for Measurement of Height of Liquid Level." Measurement and Control vol. 47(7). 2014. pp 219-224.
Jiayuan Wang. "Liquid Level Sensing Using Capacitive-to-Digital Converters." Analog Dialogue 49-04. Apr. 2015.

(Continued)

*Primary Examiner* — Patrick Assouad
*Assistant Examiner* — Haidong Zhang
(74) *Attorney, Agent, or Firm* — Harness, Dickey & Pierce, P.L.C.

(57) ABSTRACT

Methods of producing luminescence by application of a time-varying electrical signal by a single wire or transmission medium to an electroluminescent device are disclosed whereby the entire system remains at open circuit. At least one substance, material or object is employed to enhance an electric field in the area of the electroluminescent device to a level sufficient to cause light emission. Methods are disclosed to relate the light intensity thus produced to a property of the electric field-enhancing substance, material or object thereby allowing a measurement of the property. The electric field-enhancing substance, material or object(s) can comprise part of the transmission medium or be placed on or near the electroluminescent device.

40 Claims, 31 Drawing Sheets

(56) References Cited

U.S. PATENT DOCUMENTS

| | | | |
|---|---|---|---|
| 6,856,383 | B1 | 2/2005 | Vachris et al. |
| 7,008,559 | B2 | 3/2006 | Chen |
| 7,501,092 | B2 | 3/2009 | Chen |
| 8,810,778 | B2 | 8/2014 | Stautmeister et al. |
| 9,261,395 | B2 | 2/2016 | Shearer et al. |
| 9,741,948 | B2 | 8/2017 | Berger et al. |
| 10,084,042 | B2 | 9/2018 | Welch et al. |
| 10,241,111 | B2 | 3/2019 | Akhavan-Tafti et al. |
| 2002/0054696 | A1 | 5/2002 | Lee |
| 2003/0151735 | A1 | 8/2003 | Blumenfeld et al. |
| 2004/0252867 | A1* | 12/2004 | Lan ............... G06K 9/0004 382/124 |
| 2005/0059031 | A1 | 3/2005 | Bruchez et al. |
| 2007/0095669 | A1* | 5/2007 | Lau ................ B03C 5/026 204/547 |
| 2009/0187357 | A1 | 7/2009 | Ho et al. |
| 2009/0206287 | A1 | 8/2009 | Trupke et al. |
| 2010/0097346 | A1 | 4/2010 | Sleeman |
| 2010/0105035 | A1* | 4/2010 | Hashsham ......... G01N 21/645 435/6.19 |
| 2010/0185064 | A1 | 7/2010 | Bandic et al. |
| 2011/0021970 | A1 | 1/2011 | Vo-Dinh et al. |
| 2013/0157895 | A1 | 6/2013 | Aimiya et al. |
| 2013/0298667 | A1 | 11/2013 | Bechtel et al. |
| 2013/0334960 | A1 | 12/2013 | Waffenschmidt et al. |
| 2014/0193841 | A1 | 7/2014 | Welch et al. |
| 2017/0089236 | A1 | 3/2017 | Andersen et al. |
| 2018/0132332 | A1 | 5/2018 | Akhavan-Tafti |

FOREIGN PATENT DOCUMENTS

| | | |
|---|---|---|
| KR | 20160011224 A | 1/2016 |
| WO | 200124586 A1 | 4/2001 |
| WO | 2005107818 A2 | 11/2005 |
| WO | 2017027643 A1 | 2/2017 |

OTHER PUBLICATIONS

Xiaoxhu Gao et al. "In vivo molecular and cellular imaging with quantum dots." Current Opinion in Biotechnology 2005. 16:63-72.

J. Aswathy et al. "Mn doped Zinc Sulphide nanocrystals for immunofluorescent labeling of epidermal growth factor receptors on cells and clinical tumor tissues." Nanotechnology 25 (2014) 445102.

F. Krujatz et al. Exploiting the Potential of OLED-Based Photo Organic Sensors for Biotechnological Applications. Chemical Sciences Journal. vol. 7, Issue 3. 2016.

Ying-Yu Ma et al. "Molecular Imaging of Cancer with Nanoparticle-Based Theranostic Probes." Hindawi. Contrast Media & Molecular Imaging. vol. 2017.

Congcong Mi et al. "Biosynthesis and characterization of CdS quantum dots in genetically engineered *Escherichia coli*." Journal of Biotechnology 153 (2011) 125-132.

Nako Nakatsuka et al. "Self-assembling peptide assemblies bound to ZnS nanoparticles and their interactions with mammalian cells." Colloids and Surfaces B: Biointerfaces 103 (2013) 405-415.

Stefan Niekamp et al. "Nanometer-accuracy distance measurements between fluorophores at the single-molecule level." PNAS. vol 116, No. 10.

Anja Ostrowski et al. "Overview about the localization of nanoparticles in tissue and cellular context by different imaging techniques." Beilstein Journal of Nanotechnology. 2015, 6, 263-280.

Hiroshi Toda et al. "A Novel Immunohistochemical Staining Method Allows Ultrarapid Detection of Lymph Node Micrometastases While Conserving Antibody." Japan Society of Histochemistry and Cytochemistry 44(3): 133 139.

Jung Ho Yu et al. "High-resolution three-photon biomedical imaging using doped ZnS nanocrystals." Nature Materials. vol. 12.

Yu-Hong Cheng. "Plasmonic gold nanoparticles as multifaceted probe for tissue imaging." Chem Communication. 2019.

International Search Report completed on Feb. 14, 2022 regarding European Application No. 19830706.8.

\* cited by examiner ated to the source of electrical current. Applicant has unexpectedly discovered that electrodes and leads that close a circuit from and back to a power supply or source of electrical energy are not required. It is only necessary to supply a time-varying electrical signal with a single lead, wire or conductor at a predetermined level to the electroluminescent device to create an electric field at the electroluminescent device and to provide a means whereby the electric field is increased sufficiently across the electroluminescent device to excite the electroluminescent device. This can be achieved by providing in close proximity to the electroluminescent device an object or substance that increases the electric field.

OPEN-CIRCUIT ELECTROLUMINESCENCE

FIELD

The present disclosure relates to methods and devices for generating light from electroluminescent devices under open-circuit conditions. The present disclosure further relates to uses of the present disclosure in the service of test methods and methods of detection.

BACKGROUND

Previous alternating-current electroluminescent devices as described above require a first lead, wire or conductor to provide current through a first electrode to the device and a second lead, wire or conductor at a distinct location to transmit current across the electroluminescent material back to the source of electrical current. Applicant has unexpectedly discovered that electrodes and leads that close a circuit from and back to a power supply or source of electrical energy are not required. It is only necessary to supply a time-varying electrical signal with a single lead, wire or conductor at a predetermined level to the electroluminescent device to create an electric field at the electroluminescent device and to provide a means whereby the electric field is increased sufficiently across the electroluminescent device to excite the electroluminescent device. This can be achieved by providing in close proximity to the electroluminescent device an object or substance that increases the electric field.

This section provides background information related to the present disclosure which is not necessarily prior art.

SUMMARY

This section provides a general summary of the disclosure, and is not a comprehensive disclosure of its full scope or all of its features.

The present disclosure concerns methods, materials and devices for producing electroluminescence. The present invention further concerns methods, materials and devices for producing electroluminescence at open circuit, termed open-circuit electroluminescence (OCEL). In particular, the present disclosure concerns methods of detecting and measuring a property of a material, object or substance based on the ability of the property to cause the generation of electroluminescence in such a method. In one embodiment there is provided a method for measuring a property of an object comprising:
  transmitting a time-varying electrical signal from a power source through a single electrical terminal to an electroluminescent device, wherein the electroluminescent device remains at open circuit at all times;
  positioning an object in close proximity to an electroluminescent device while the time-varying electrical signal is transmitted to the electroluminescent device, such that the object increases the amplitude of the time-varying electrical signal across the electroluminescent device and thereby generates light from the electroluminescent device;
  measuring intensity of the light emitted by the electroluminescent device; and relating the measured light intensity to the property of the object.

In another embodiment the method further comprises measuring the intensity of light and relating the light intensity to presence, position or quantity of the object or substance.

In another embodiment there is provided a method for measuring a property of a material, object or substance comprising:
  transmitting a time-varying electrical signal from a power source through a single electrical terminal to an electroluminescent device, wherein said electroluminescent device comprises an electrode and a phosphor material layer deposited on a surface of the electrode, and wherein the electroluminescent device remains at open circuit at all times;
  positioning an object in close proximity to an electroluminescent device while the time-varying electrical signal is transmitted to the electroluminescent device, such that the object increases the amplitude of the time-varying electrical signal across the electroluminescent device and thereby generates light from the electroluminescent device;
  measuring intensity of the light emitted by the electroluminescent device; and
  relating the measured light intensity to the property of the object.

In a further embodiment the method above further comprises measuring the intensity of light and relating the light intensity to presence, position or quantity of the object or substance.

Further areas of applicability will become apparent from the description provided herein. The description and specific examples in this summary are intended for purposes of illustration only and are not intended to limit the scope of the present disclosure.

BRIEF DESCRIPTION OF THE SEVERAL VIEWS OF THE DRAWINGS

The drawings described herein are for illustrative purposes only of selected embodiments and not all possible implementations and are not intended to limit the scope of the present disclosure.

DETAILED DESCRIPTION

Figure 1:
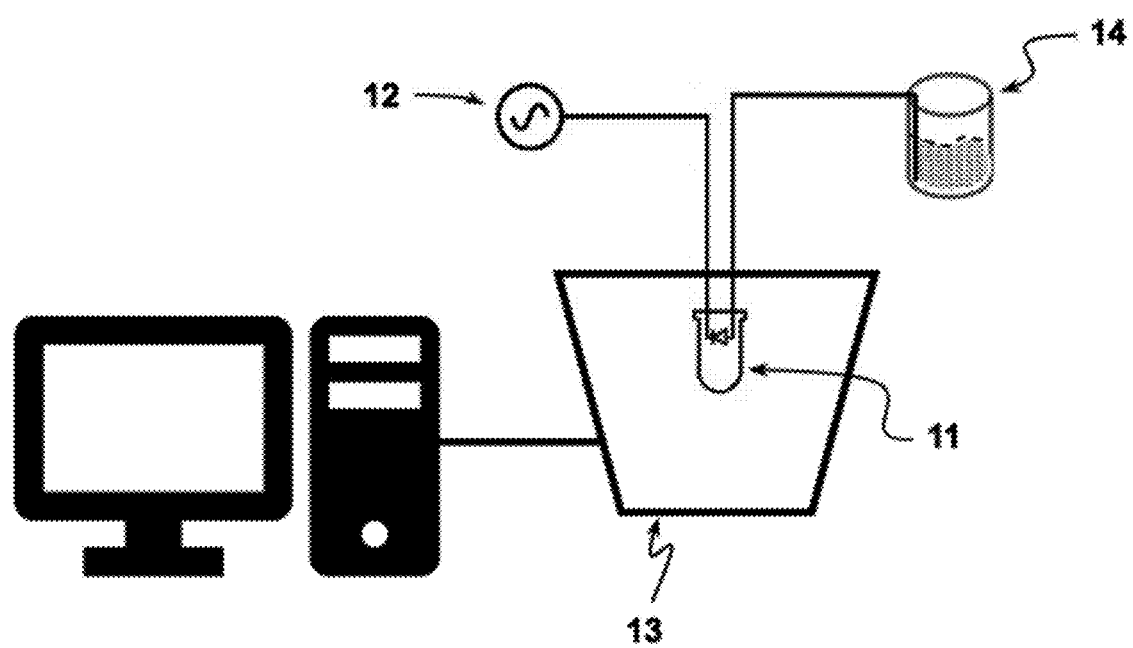
FIG. 1 is a diagram depicting an example embodiment of a system using an LED lamp for producing electroluminescence in proportion to the amount of water in a container.

Example embodiments will now be described more fully with reference to the accompanying drawings.

It is to be understood that the term object as used throughout the application is considered to mean individual objects or things as well as quantities of a material or substance such as a liquid which may be contained in a container, or a length of wire or quantity of sheet, film or foil, etc. The term object may be used interchangeably with the phrase material, substance, or object.

The property of the electric field-increasing object or substance can be any of a variety of physical or chemical properties. In various embodiments illustrated below, the property can be one of a group selected from volume, mass, area, length, distance, concentration in a solution, pH, ionic strength, ratio of two substances in admixture, polarity, conductivity, capacitance, and temperature. Various example formats and the means of using the present methods based thereon as a way of detecting, measuring or quantifying a property of the object or substance are described in more detail below in several non-limiting example embodiments.

Light-Emitting Diodes (LED)—

In some embodiment of the present methods the electroluminescent device is a light emitting diode or LED. Conventional LEDs feature a semiconductor chip surrounded by an epoxy shell with anode and cathode wires protruding. The semiconductor chip is doped to have p and n regions and create a p-n junction. A hallmark of LEDs is that current flow is unidirectional. In the present disclosure it has been found that the choice of which electrode is connected to the power supply is immaterial. Representative semiconductor materials found in LEDs useable in the present methods include GaAs, AlGaAs, GaAsP, AlGaInP, GaP, GaAsP, AlGaP, InGaN, GaN, and ZnSe. Such LEDs are commercially available and individual lights are available to produce any color in the visible spectrum. The methods of the present disclosure can involve the use of more than one LED bulb to produce electroluminescence. Arrays of a two- or three-dimensional shape are within the scope of the present methods as are assemblies of LEDs of different emission colors.

In another aspect of the present methods the electroluminescent device comprises an electrode and at least one phosphor material deposited as a layer on a surface of the electrode. In some embodiments the phosphor material layer covers a discrete region of a surface of the electrode. In some embodiments a phosphor material layer may cover a plurality of discrete regions of a surface of the electrode. The regions may be of any shape or dimensions and when a plurality of regions occur may be the same or different in size and shape. In certain embodiments wherein a plurality of different phosphor materials is used and wherein each region is covered with a single phosphor material, each of the different phosphor materials may be chosen to emit light of a different color. In this manner, various patterns may be produced, or different colors of light may result when the regions are small. A well-known example is the generation of white light by the mixing of red, green, and blue.

In another embodiment the phosphor material layer comprises an admixture of different phosphor materials. This may be performed as another method of producing new or mixed colors as described above. In yet another embodiment a phosphor material may be combined into or embedded in a dielectric material.

Electrodes—

The electrode used in the present methods may be of any practical or convenient shape or geometry as long as it is capable of bearing a layer of phosphor material on a surface. In some embodiments the electrode may be planar. In some embodiments the electrode may be curved. The electrode may advantageously be optically transparent such as glass coated with Indium-tin-oxide (ITO), fluorine-doped tin oxide (FTO), $SnO_2$, Al-doped ZnO, Ga-doped ZnO, or other ternary or quaternary transition metal oxides as are known in the art. Glass coated with graphene, carbon nanotubes, and metal nanowires are also considered within the scope of usable electrode materials.

It is anticipated that ancillary materials, such as conductors, metallic elements—clips, screws, nuts/bolts, pins etc. may be used in the construction and assembly of devices for performing the methods of the present disclosure. Selection of such materials is within the ability of the skilled person and does not depart from the inventive concept disclosed herein.

Phosphors—

Phosphor materials usable in the present disclosure can be any known substance or material known to generate light by application of an alternating or direct current. Exemplary materials can be selected from the group consisting of semiconductor particles, doped semiconductor particles, elemental Si particles, elemental Ge particles, quantum dots, fluorescent monomers, fluorescent oligomers, fluorescent polymers, phosphorescent monomers, phosphorescent oligomers, phosphorescent polymers and mixtures thereof. Phosphor materials have at least one of the properties of exhibiting fluorescence, delayed fluorescence or phosphorescence.

Particulate Phosphor Materials—

In some embodiments phosphor materials are advantageously provided in the form of small particles, typically of a size less than about 0.1 mm (100 micrometers). In some embodiments the particles will be less than about 1 micrometer. In other embodiments the particles will be nanoparticles in a size range of about 1-100 nm. In one embodiment nanoparticles are composed of a quantum dot semiconducting core material and a shell of a distinct semiconducting material. The core and the shell are typically composed of type II-VI, IV-VI, and III-V semiconductors, for example CdS/ZnS, CdSe/ZnS, CdSe/CdS, and InAs/CdSe. In some embodiments the electroluminescent device comprises a quantity of nanoparticles of a material type known in the art to be capable of generating electroluminescence. Commonly these particles are made of inorganic semiconductor materials. One class of such electroluminescent materials comprises ZnS doped with a second metal. Incorporating small amounts of dopant elements in the nanocrystals enables adjusting of the color or wavelength of the electroluminescence emission from the nanoparticles. Included among these are ZnS doped with transition metals or rare earth metals. Representative examples include Mn (yellow-orange emission), Cu (green emission), Al, Sm, Tm, Er, Nd, or Eu. Other usable materials include semiconductors containing group III and group V elements, such as indium phosphide (InP), gallium arsenide (GaAs), and gallium nitride (GaN). Undoped and doped semiconductor particles may optionally be oxide-coated.

In another embodiment nanoparticles include a family of particles synthesized with the aid of a porous support material as disclosed in commonly owned co-pending U.S. patent application Ser. No. 15/240,271 and U.S. Ser. No. 15/240,407. Such materials may be used with or without the support material being present.

Particles as used in the present application are not limited to any particular shape and may have different shapes, including spheres, cubes, rods, wires, or plates, or a mixture of shapes within any given sample portion.

In some embodiments the phosphor material will comprise a continuous layer of an organic luminescent material. A plethora of such compounds are known in the literature and used at present, e.g. in producing thin film devices. Listings of such materials are found in many standard treatises on the subject. Commonly used OLED materials include polymeric materials such as polyphenylene (PPP), polyphenylene vinylene (PPV), polyfluorene, polyaniline, polythiophene (PT), and polyethylenedioxythiophene (PDOT), and small molecules such as $Alq_3$, metal phthalocyanines, and iridium or ruthenium organometallic complexes. The use of any such material is considered within the scope of the present methods. Devices containing two or more layers with different organic luminescent material in each layer are specifically considered to be usable in the methods of the present disclosure, particularly when more than one color of light is to be produced or when producing a composite color by combining different color emitters as is commonly done to produce white light by combination of red, green and blue light emission.

In some embodiments the electroluminescent device further comprises the use of dielectric materials as layers or coatings. For example, a dielectric coating over a surface of the phosphor layer opposite the transparent electrode. In some embodiments the electroluminescent device further comprises a dielectric coating between the transparent electrode and the phosphor layer. Dielectric coatings may, alternatively be used both over a surface of the phosphor layer opposite the transparent electrode and between the transparent electrode and the phosphor layer. Layers as used herein includes liquid materials applied and, if necessary, dried in place. Layers may be applied as a pre-manufactured thin film or as a tape. The thickness of the layer of dielectric material may be determined and adjusted as needed and by reference to the numerous examples reported in the patent and technical literature. Typical layers may range from 1 micron to 1 mm, for example and may optionally be of uniform thickness. The method of application of dielectric layer is not limited to any particular technique and may include dipping, applying a liquid layer and spreading, spin coating and other ways generally known in the art.

Dielectric Materials—

Materials useful as dielectric materials in the present methods include, without limitation, $BaTiO_3$, $SrTiO_3$, barium strontium titanate, calcium copper titanate, nitrile rubber, vinyl glove material, paraffin, polymers including polyethylene, polyimide, poly(dimethylsiloxane), polystyrene, poly(methyl methacrylate), polypropylene, polyethylene terephthalate, polyurethanes, nylon polymers, acrylonitrile-butadiene rubber, vinyl rubber, glass, and graphene. Mixed dielectric materials are contemplated for use as well as using more than one discrete dielectric material in combination.

In another embodiment there is provided a method for measuring a property of a fluid comprising:

providing a power source for supplying time-varying electrical energy providing an electroluminescent device;

transmitting time-varying electrical energy from the power source to the electroluminescent device through the fluid so that the electroluminescent device experiences an electric field;

placing in close proximity to the electroluminescent device at least one material, object or substance that increases the electric field;

wherein light intensity is generated from the electroluminescent device in proportion to the property of the fluid;

wherein the electroluminescent device remains at open-circuit at all times; and relating the light intensity to the property of the fluid.

Transmitting Media—

The time-varying electrical energy is transmitted from the power source to the electroluminescent device by a transmitting conductor. Any material capable of transmitting an electrical signal, viewed as an oscillating electric field, can be used as a transmitting medium in the present methods. Conventional metal wires, leads, and connectors, including gold, silver, copper and aluminum may be used. Due to the lack of any required conductive path back to the power supply however, the choice of material for transmitting time-varying electrical power to the electroluminescent device is broader. In some embodiments the transmitting conductor can be a fluid, more particularly, a liquid. Advantageously, the liquid may be an electrically conductive liquid. Water and aqueous solutions containing salts, for example can be used in this capacity. In embodiments of the present disclosure wherein the time-varying electrical power is transmitted to the electroluminescent device by a fluid, it has been discovered that the light intensity generated by the electroluminescent device is proportional to the quantity of the fluid. Such methods performed in accordance with this embodiment can therefore serve as a way of determining the quantity of the fluid, e.g. its mass or volume. More particularly, the method can serve as a way to determine the length of a column of fluid contained in a tube that contains the fluid. In other embodiments the light intensity generated by the electroluminescent device is proportional to another property of the fluid. These other properties include for example, conductivity, dielectric constant, polarity, volume, concentration of a solute, or pH. Yet other embodiments can use a combination of two or more different materials, e.g. a conductive wire and a liquid-filled tube. In embodiments where the transmitting conductor or medium comprises a fluid, the material or object in close proximity to the electroluminescent device may be a simple metallic wire, such as one leg of a commercially available LED lamp.

In some embodiments the transmitting medium will be positioned between the electroluminescent device and the power supply. In still other embodiments the transmitting medium may wholly or partially surround, in two dimensions or even completely envelop in three dimensions, the electroluminescent device. In such formats the electroluminescent device may be partially or fully covered with a dielectric material, but the methods of the present disclosure are not limited to these cases and no dielectric layer or barrier is required.

In another embodiment, there is provided a method for measuring a property of a fluid comprising:

transmitting a time-varying electrical signal from a power source through a single electrical terminal to an electroluminescent device through the fluid, wherein the electroluminescent device remains at open-circuit at all times;

positioning an object in close proximity to an electroluminescent device while the time-varying electrical signal is transmitted to the electroluminescent device, such that the object increases the amplitude of the time-varying electrical signal across the electroluminescent device and thereby generates light from the electroluminescent device;

measuring intensity of the light emitted by the electroluminescent device; and relating the measured light intensity to the property of the fluid.

Power Source—

The power source in some embodiments can be a cold cathode fluorescent lamp (CCFL) inverter. CCFL inverter operates at high voltage (few volts to tens of kilovolts) and high frequency (10-50 kHz). CCFL are often used for backlighting liquid crystal display (LCD) panels. The CCFL models include for example: JKL components (BXA-24529, BXA-601), TDK (CXA-M10M-06Y15R, CXA-P1612-VJL, CXA-L0505-NJL), etc.

CCFL circuits normally operate at an input voltage of 0-24 VDC. The voltage output of CCFL can be adjusted with modifying the inverter circuit elements and/or changing the input voltage. The latter was accomplished with the use of batteries, AC/DC transformer (adapters), and/or a lab-grade variable direct current (DC) power supply. In particular, VOLTEQ HY3006D is a regulated linear DC power supply and is continuously adjustable at 0-30 VDC and 0-6A.

In other embodiments, plug & play systems were tested. In this case, the power supply is the typical North American/European power outlet with single-phase unit which has a 0-110/220 VAC output voltage and frequency of 50/60 Hz. Other commercial voltages and frequency can also be used.

The time-varying electrical energy as used in the present inventive methods includes alternating current having a sinusoidal waveform of a wide range of frequencies. Frequencies useful in the practice of the present methods can range from 1 Hz to 200 kHz, or in some embodiments from 20 kHz to 50 kHz. Other forms of modulated amplitude signal that provide a change with respect to time are considered to be within the scope of the invention such as square waves, sawtooth waves and one or more pulsed electrical signals. Although it is not necessary for explaining the means of practicing the methods of the present disclosure, it is to be understood that the application and transmission of electrical signal described as providing a time-varying electrical energy, inherently creates and transmits an electric field.

Conventional devices and apparatus for producing electroluminescence feature a source of electric current transmitted through a wire to a lead or electrode coupled or connected to an electroluminescent device and further having a second lead or electrode that conducts current through a wire back to the source of electric current to close the electrical circuit, a so-called "closed-circuit" configuration. Applicant has unexpectedly discovered that the use of the second additional electrodes and leads that close a circuit from a power supply or source of electrical energy to the electroluminescent device and back to the power supply are not required. In other words, the electroluminescent device is at "open circuit" and yet produces light. It is only necessary to supply a time-varying electrical signal to the electroluminescent device and provide a means whereby the electric field is increased sufficiently in the region of space around the electroluminescent device. This can be achieved by providing in close proximity to the electroluminescent device an object or substance that increases the electric field. Without wishing to be bound by any particular theory of operation, substances, materials and objects which can serve this purpose in the methods of the present disclosure include those which can store electric charge, i.e. demonstrate capacitance.

Further, it has been found that the time-varying electrical energy can be transmitted to the electroluminescent device through other types of transmission media. Representative transmission media can include liquids such as water, gases such as air, and solids.

In operation the methods of the present disclosure for producing open-circuit electroluminescence (OCEL) provide numerous advantages compared to the conventional closed-circuit EL (CCEL). Prior art CCEL technology operates in a manner governed by the capacitive characteristics of the electrodes and dielectric and emissive layers. The present methods, are sensitive to any environmental variations in the properties of the electrode(s), EL device(s), dielectric layer(s), transmission media, and the material or the substance that causes the enhancement of electric signal across the EL device. The responsiveness to environmental conditions brings about advantageous operational and design flexibility characteristics which (without limitation) include:

1. Several substances can be examined simultaneously. The present method and systems can examine various materials and their capacitive and/or (electromagnetic) conductive properties without the need to change any of the required elements of the system, i.e., time-varying power supply, the energized electrode, as well as the emissive EL device. Dielectric layers are optional and can be a combination of various material/substances. This feature is uniquely of interest for the following applications: sensors, detectors, analytical instruments, etc.

2. Pattern recognition. Using a combination of EL material and/or dielectric layers, the OCEL system can detect patterns. This feature is particular interest for pattern recognition technologies, such as fingerprint characterization, tissue structural examination, etc. The pattern recognition capability has a resolution of 2 nm.

3. The emissive EL layer can be changed for optimal results. As suggested in the below experiments, various phosphors respond best within a certain range of frequencies and electric field strengths. The ability to change the EL layer within the same system broadens the experimental conditions under which OCEL can operate.

4. Operates wirelessly. In the presence of a strong electromagnetic field, an OCEL system can operate without the need for a physical contact between the time-varying power supply and the electrodes.

5. Operates within various media. As demonstrated below, OCEL can operate while submerged in polar (conductive) media. In this case, a water bath can serve as either the hot electrode and/or the substance which enables strengthening of the electric field across the EL device.

6. Operates in conjunction with other optical and electrical devices. Luminometers, spectrometers, CCD cameras, fiber optics, passive and adaptive optics can be coupled with the OCEL device to transmit the light output into a communicable signal.

7. Requires small input power to operate. The OCEL operates at or below a few watts.

8. Efficient. OCEL converts the majority of the input power into emission. The capacitive characteristic of OCEL eliminates the power waste (heat, current leak, etc.) associated with competing technologies.

9. Safe. OCEL operates within the RMS electrical current range of 1-200 pA which is well below Occupational Safety and Health Administration guidelines (<3 mA).

10. Free form. The OCEL system is not limited to a specific geometry of the subcomponents. Existing EL devices are only offered in planar (sandwich) or co-planar formats. Various 1D, 2D,& 3D format OCEL devices have been successfully tested.

11. EL material can be cast into shapes and in some cases held in place with dielectric material and/or the electrode. Unlike LEDs, the emissive layer can be formed into the desired shape. The shape will emit light when energized. This characteristic is of particular interest for consumer goods, entertainment, and lighting applications.

12. Multiple devices can be coupled. More than one OCEL device can be operated from the same time-varying power supply.

13. Tunable emission color. Multiple EL materials can be used for optimal frequency and/or electrical current range. In addition, this feature allows for the production of emissions with various colors.

14. Tunable resolution. Various EL materials can be used to modify the resolution of the EL device.

15. Tunable EL layer lifetime. Existing EL devices use electrodes with finite light absorption, such as the ITO glass. This means that higher voltages must be applied in order to operate the EL device at the desired light output. Higher voltages lower the lifetime of the EL material. OCEL works with substances that help enhance the local electric field (such as water) where no absorption is expected. The lower required voltage increases the lifetime of the EL device.

16. Emissive layer can be coated with insulating material for improving durability and enhancing device lifetime.

17. EL layer can be applied onto the hot electrode or on the surface of the material or substance that helps to enhance the electric field across the EL device or be an independent layer. This feature will allow for a variety of applications, in particular, wireless applications.

18. Works without the need for a support material. All existing EL technologies depend on electrodes, as the support member, for holding the EL device and dielectric layer in place. Free-form OCEL works also in environments where the EL material is floating (unattached) in a container.

19. Works independent of the direction of the applied time-varying electric energy. Unlike other unidirectional, diode-like EL devices, OCEL works regardless of the direction (positive-to-negative or negative-to-positive) of input voltage. This means that the EL device can be energized in any orientation. The signal can be with a positive or negative offset. The time average of the signal can be below or above zero.

20. Improved contrast ratio: The use of a combination of EL material and/or different dielectric layers allows the production of a system whose light output for electrical energy E1 and E2=(E1)/2 are easily distinguishable. This feature makes OCEL uniquely sensitive to small variations of the electrical energy applied across the EL layer.

21. Tunable dielectric layer: the change in the thickness (distance between the EL device and the conductive body), or the surface area of the electrode and/or the conductive body can change the light emission intensity. In addition, the light intensity can change depending on the type of dielectric used (ex. solutions of different dielectric constant).

Substances and Materials that Increase the Electric Field—

Substances, materials and objects which exhibit electrical conductivity also are generally thought to be included in this category. Metals and metal alloys are representative exemplary materials. Metals useful in the practice of the present disclosure include, without limitation, gold, silver, copper, zinc, nickel, aluminum, alloys including brass, bronze, steel, and stainless steel.

In some embodiments the object that serves to increase the electric field may be a quantity of a liquid chosen from among polar liquids including water, alcohols such as methanol, ethanol, 1-propanol, 2-propanol, ethylene glycol, glycerol, and propylene glycol, polar aprotic solvents including dimethyl sulfoxide, dimethyl acetamide, dimethylformamide, acetonitrile, as well as mixtures of two or more liquids in any proportion. Other conductive materials such as solid or liquid conductive polymers are considered within the scope of the materials useful in the methods of the present disclosure.

Various substances, materials or objects are useful in the present methods for placing in close proximity to the electroluminescent device in order to increase the electric field and thereby cause light emission from the electroluminescent device when time-varying electrical current has been transmitted thereto. These substances, materials or objects are not specifically limited by their physical size or shape. In some embodiments where the substances, materials or objects are solids they may be in an approximate one-dimensional shape such as a wire of any convenient length. In other embodiments they may be in an approximate two-dimensional shape such as a sheet, leaf, roll, or panel of material and is not limited to any particular geometric shape. In still other embodiments they may be three-dimensional and take any desired shape. In certain embodiments it may be desirable to restrict the physical area of the substance, material or object in proximity to the electroluminescent material in order to concentrate the field-increasing effect to a localized region or area.

In embodiments wherein a liquid substance in close proximity to the electroluminescent device acts to increase the electric field, the liquid may be enclosed within a vessel or container. Said vessel or container may contact the electroluminescent device. Common vessels and containers include, cups, test strips, test tubes, microwells, microwell strips or plates, and other conventional containers in common laboratory use. In such embodiments the vessel or container comprises one or more walls having a thickness and the thickness establishes a separation distance between the electroluminescent device and the substance that increases the electric field when used in the present methods.

The liquid substance that increases the electric field can in some embodiments be a solution comprising a solvent and at least one solute. In some embodiments the solution can be an aqueous solution. The one or more solute may advantageously be selected, without limitation, from the group consisting of acids, bases, inorganic salts, organic salts, water-soluble organic solvents, water-soluble polymers, amino acids, peptides, proteins, drugs, dyes, enzymes, enzyme substrates, nucleotides, nucleosides, and nucleic acids and mixtures thereof.

Living bodies, comprising a substantial quantity of water, and parts of living bodies function in the capacity of increasing the local electric field and can serve in the present methods of producing electroluminescence. Living bodies includes plants and animals including mammals, especially the human body. In one embodiment, the present methods may be employed in service of producing a signal for creating an image of a fingerprint for identification or security purposes. The present methods can be applied to imaging other areas of skin, regions of other animal bodies and even inanimate objects and for obtaining information about the properties, including the size or surface characteristics such as textures of objects in contact.

In another embodiment a part of a human body comprises a portion of a body tissue or a tissue section. Such a portion of tissue or tissue section is conveniently applied or adhered to a conventional glass slide of the type used in microscopy techniques. Such sections may be of any convenient thickness and thus are not particularly limited in this regard. Use of semiconductor phosphor particles of sufficiently small size or diameter permits microscopic imaging to be performed.

Close Proximity—

The term in close proximity indicates any close spatial relationship effective for increasing the local electric field at the electroluminescent device and includes actual physical contact, or a zero separation distance. Distances greater than zero, i.e. non-contact, can also be used as long as the separation does not prevent the electric field enhancement. Typical distances in practice will generally be on the order of 1 cm or less, and frequently 1 mm or less. In some embodiments a layer of dielectric material will provide a physical barrier between an electroluminescent device or portion thereof, and the field-increasing substance, material or object and thus determine a distance of physical separation. In some embodiments a dielectric so used may have a thickness in the range of 0.001 to 1 mm. In other embodiments the thickness may be in the range of 0.01 to 0.1 mm.

The substance used to increase the electric field can be disposed relative to the other elements of the system in any convenient order or relationship. Although the term substance is used herein to describe materials that serve to increase the electric field, more than one such substance, operating together, can be used. In one embodiment a wire or copper tape or both together may directly contact the electroluminescent device and another end of the wire is placed in contact with a vessel of liquid or another solid substance. Many additional exemplary combinations of such substances are shown in the examples below. In some embodiments, for example where the electroluminescent device is a planar support having a phosphor layer applied onto one surface, the field-increasing object, material or substance may be positioned in a region located distally from the power supply with regard to the phosphor material. In embodiments where the electroluminescent device is an LED bulb, electrical current may be transmitted to one of the cathode or anode legs and the field-increasing object, material or substance placed in close proximity to the other of the legs. In other embodiments the field-increasing object, material or substance can be positioned between the electroluminescent device and the power supply. In still other embodiments the field-increasing object, material or substance may wholly or partially surround in two dimensions or even completely envelop in three dimensions the electroluminescent device. In such formats the electroluminescent device may be partially or fully covered with a dielectric material, but the methods of the present disclosure are not limited to these cases and no dielectric layer or barrier is required.

Light Emission and Detection—

The electroluminescent devices of the present disclosure generate light at wavelengths, more accurately ranges of wavelengths, governed by the emissive properties of the phosphor materials used. In general light is produced in a region of the electromagnetic spectrum spanning the ultraviolet, visible and near infrared wavelengths. One or more colors of light can be generated in the methods of the present disclosure by deliberate choice of phosphors.

Electroluminescent light produced in the present methods may be detected by any suitable means and is not limited to any particular mode of detection or visualization. Light produced in the visible portion of the spectrum can be detected by eye, for example. Other means of detecting the emitted light include digital cameras, photographic film, CCD chips, and sensor arrays. Commercial or purpose-built luminometers also can be used to detect and measure the electroluminescence produced in the present methods. Luminometers having a measurement chamber designed to house a single sample tube such as a Turner Designs TD 20/20 or similar can be used. Alternatively, luminometers designed to receive a 96-well microplate and measure each of the wells can also be used. In some embodiments it may be desirable to select a portion of the wavelengths of light emitted. In such cases the method may further comprise the use of monochromators (prism or grating), or optical filters including low-pass, high-pass and notch or band-pass filters. Optical systems including microscopes using a variety of lenses for optical magnification and selecting a plane of focus can be used in some embodiments.

Applications of the Methods of the Invention—

The methods of the present disclosure find many areas of applicability by making use of the fact that light intensity generated by the electroluminescent device is proportional to a parameter related to the substance placed in proximity to the electroluminescent device. In some embodiments the parameter will be based on the quantity of the substance, e.g. the surface area, mass, volume or length of a column of sample. In other embodiments the light intensity will be relatable to a parameter based on some intrinsic property of the substance. When the term proportional is used herein it is understood to comprehend not just a simple 1 to 1 relationship or a linear dependence but also other numerical forms of relationships such as quadratic, other polynomial orders, logarithmic, exponential and the like. The important feature is that a dependence of light signal intensity and the measured parameter or property be established through measurement of a set of samples covering a range of values. Calibration curves or proportionality constants can thereby be derived. By use of such methods using the techniques of the present disclosure, analytical test methods can be developed which can be quantitative, semi-quantitative, qualitative, yes/no, cut-off or threshold value type tests.

Test Methods—

In some embodiments the substance that increases the electric field is an aqueous solution containing a solute and light intensity generated by the electroluminescent device is proportional to the amount or concentration of the solute in the aqueous solution. In some embodiments the solute is the product of a chemical or biochemical reaction. In this way the method can be used for the purpose of monitoring the progress or extent of a reaction. An example reaction whose progress can be monitored would be a reaction that produces or consumes ionic species. When the solute that is produced or consumed is an acid or base then the method of the present disclosure can provide an indication of change of solution pH.

In some embodiments the reaction solution comprises a solution containing an enzyme and an enzyme substrate and optionally a buffer and cofactors that promote enzyme activity and whereby the enzyme reacts with the substrate to produce the soluble reaction product and the amount of the reaction product is proportional to the light intensity produced.

In another embodiment the substance that increases the electric field is mixture of two liquids each of which is capable of increasing the electric field but to a different degree. In such embodiments the light produced will differ depending on the relative amounts or ratio of the two liquids. The ratio can be expressed in any suitable form for example as a weight percent of each, a volume percent of each or a molar ratio of each.

Additional uses enabled by the methods of the present disclosure include fingerprint detection, detection of liquids, for example as leaks in a liquid transport system, analyte detection, enzyme assays, depth sensors, distance sensors, and conductivity measurement. Other uses of the present methods not specifically listed here can be thought of by one of skill in the art by reference to the embodiments described and examples disclosed herein.

Example embodiments will now be described more fully with reference to the accompanying drawings.

Figure 29A:
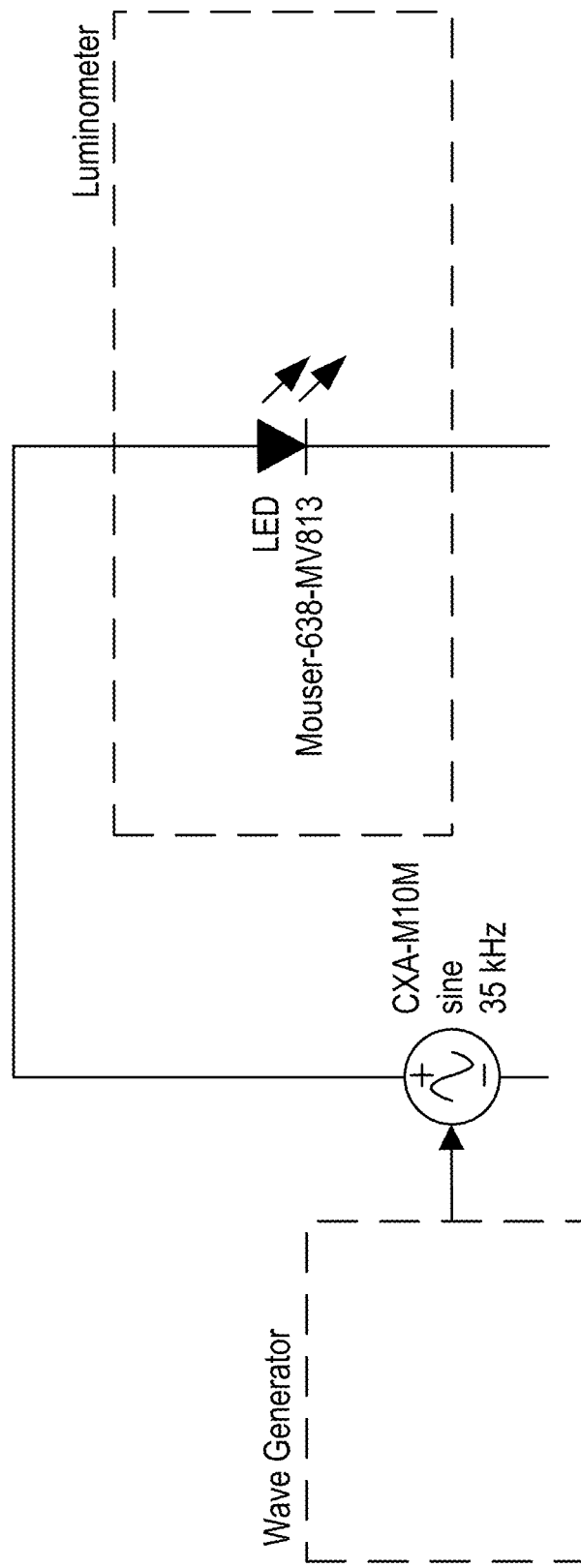
FIG. 29A is a diagram depicting an apparatus used in embodiments of the present disclosure.

Description of a Representative Time-Varying Electrical Power Supply with Reference to FIG. 29—

Figure 29B:
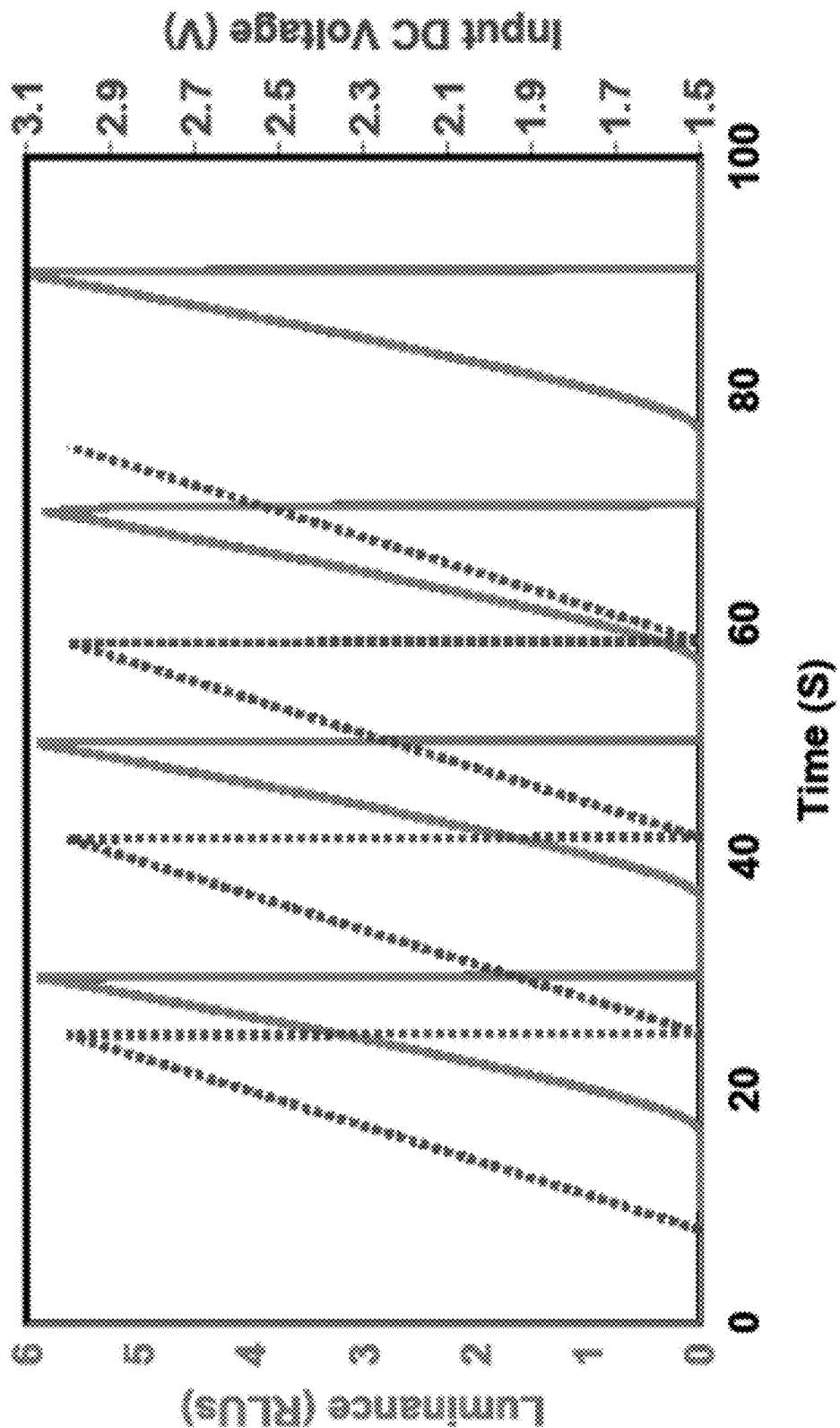
FIG. 29B is a graph showing the luminance response of an LED to time-varying input voltage according to an embodiment of the present disclosure.
Figure 29C:
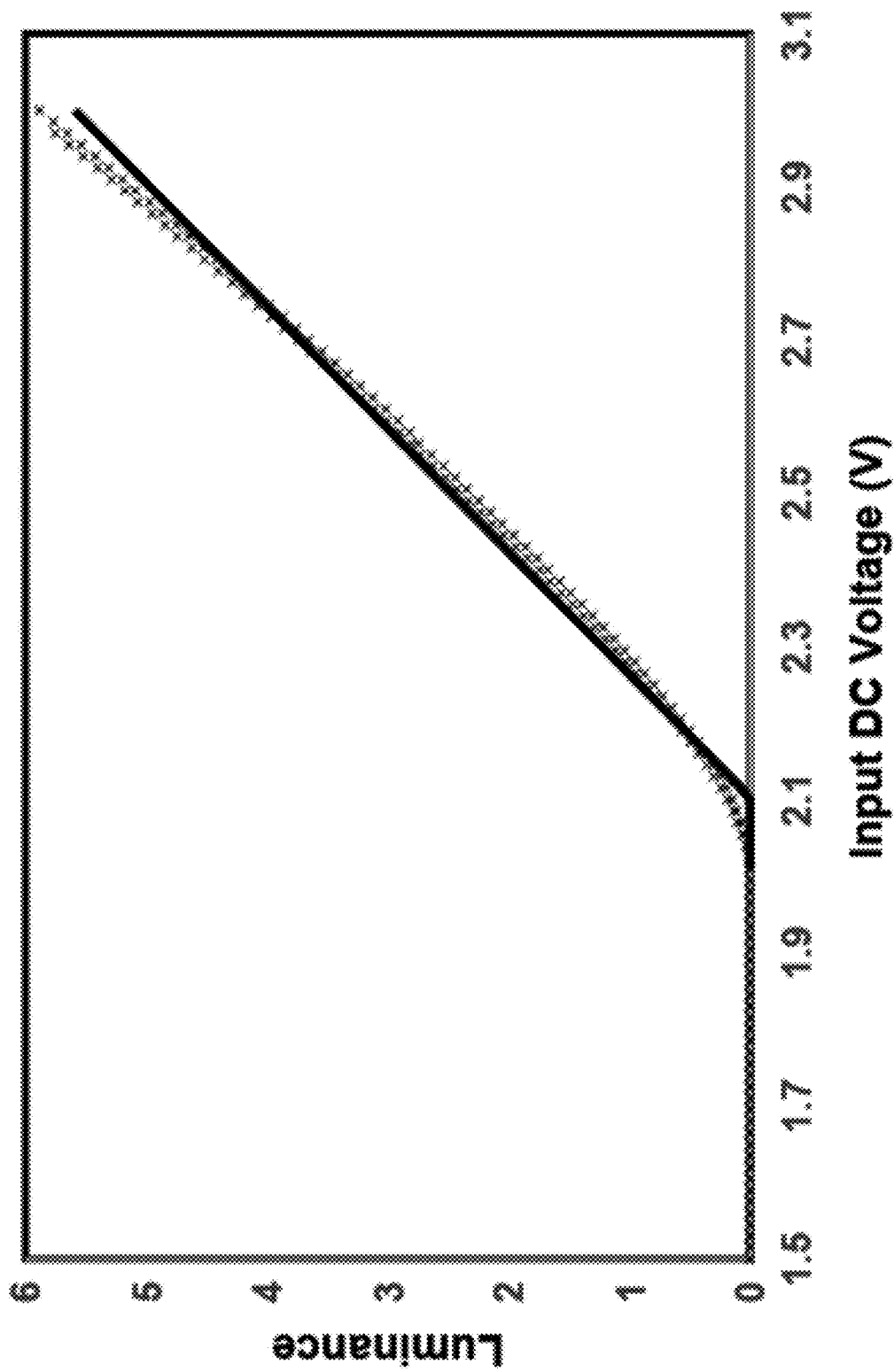
FIG. 29C is a graph showing change in light intensity (luminance) as a function of modulating DC input voltage into a power source producing an AC signal that is transmitted to an LED according to an embodiment of the present disclosure.

In one embodiment, a high-frequency (35 kHz) CCFL circuit with adjustable input voltage was used to demonstrate the response-luminance profile of a red LED. CCFL circuit CXA-M10M-06Y15R was powered by a wave generator (BK Precision 4052). The system configuration of the CCFL circuit connected directly to an LED (Mouser P/N: 638-MV8113) in an open-circuit format and measured using a luminometer (TD-20/20, Turner Designs) are demonstrated in FIG. 29A. In this example, the substance or material that causes electric field to enhance across the LED is a wire of unknown properties. A ramp waveform varying linearly between 1.5-3 VDC at 50 mHz was fed into the high frequency CCFL circuit. The luminance response of the LED to this input voltage is shown in FIG. 29B. Similarly, FIG. 29C shows how LED luminance changes as a function of modulating DC voltage. The polynomial fit suggests that the LED luminance can be defined as a second-order polynomial function of the input DC voltage. Modulating DC input voltage enables monitoring changes in the properties of the material or substance that strengthens the electric field across the EL device over time. The polynomial function may also give information regarding the physical properties of the substance or material of interest, including, but not limited to, the dielectric constant.

The change in luminance as a function of input voltage for any substance or materials of interest can thereby be examined and compared. Trial adjustment of input voltage in the system just described permitted it to be used to obtain the desired sensitivity and dynamic range of measurement for the several examples described below.

Figure 2:
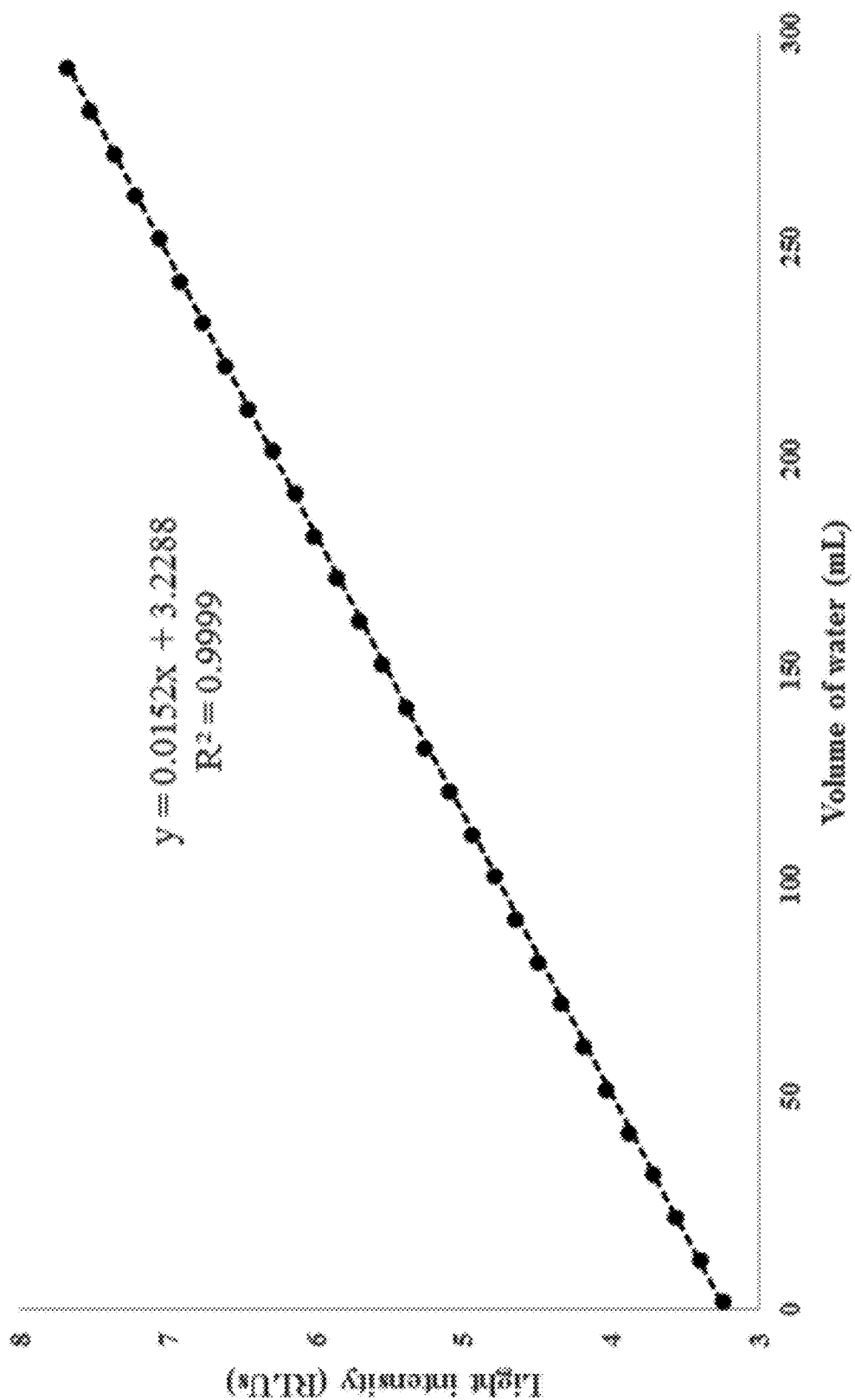
FIG. 2 is a graph depicting the relationship between light intensity and water volume using an embodiment of the present disclosure.

Example 1 with Reference to FIGS. 1 and 2—

In a first example embodiment, an EL device was used in a method of the present disclosure to measure the effect different volume samples of water have on light intensity. A red LED 11 was used as the electroluminescent device. The LED 11 was placed inside a luminometer 13, with one leg of the LED connected by a single wire to the AC power source described above 12. The other leg of the LED was fixed at the bottom of a micro-container 14, so that the electroluminescent device was at open-circuit. The intensity of the light generated by the LED was measured by the luminometer and plotted over time. The light intensity of the open-circuit electroluminescent device with empty micro-container 14 was set as background. 2 µL of water was added to micro-container 14 and the change in the light intensity of the open-circuit electroluminescent device was recorded using the luminometer. Similarly, another 2 µL increment of water was added to the micro-container and the change in the signal was recorded. Extracted data show a linear relationship in FIG. 2 between the intensity of the light from electroluminescent device and volume of the water added to the micro-container.

Figure 3:
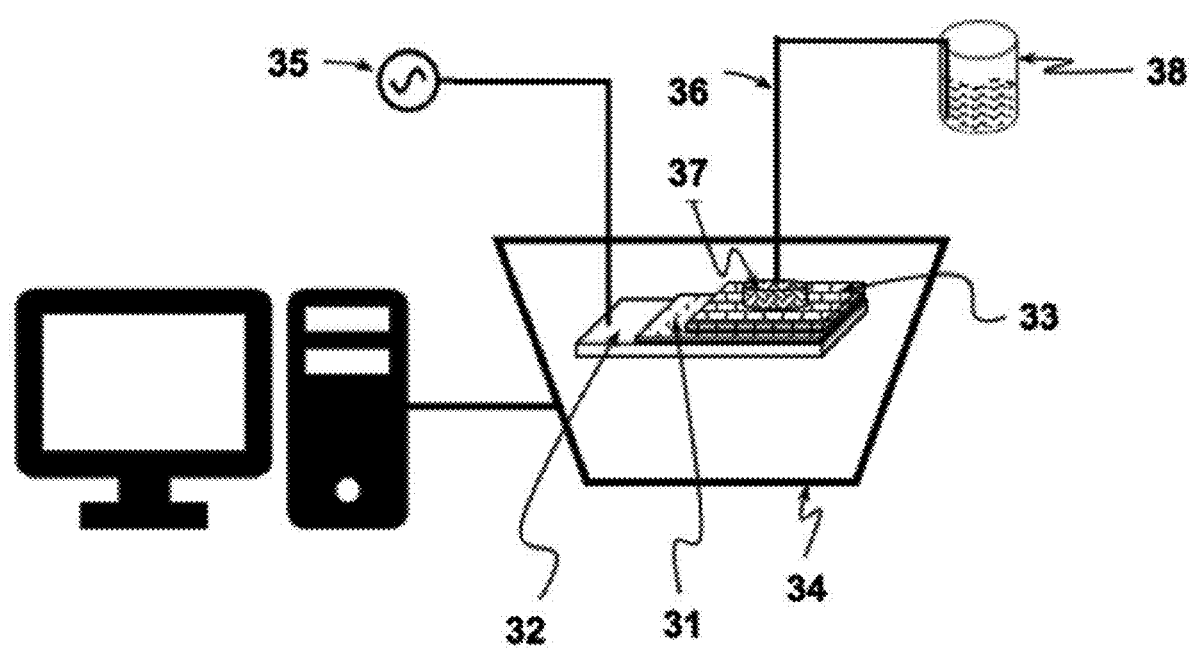
FIG. 3 is a diagram depicting an example embodiment of a system using a phosphor layer for producing electroluminescence in proportion to water quantity.
Figure 4:
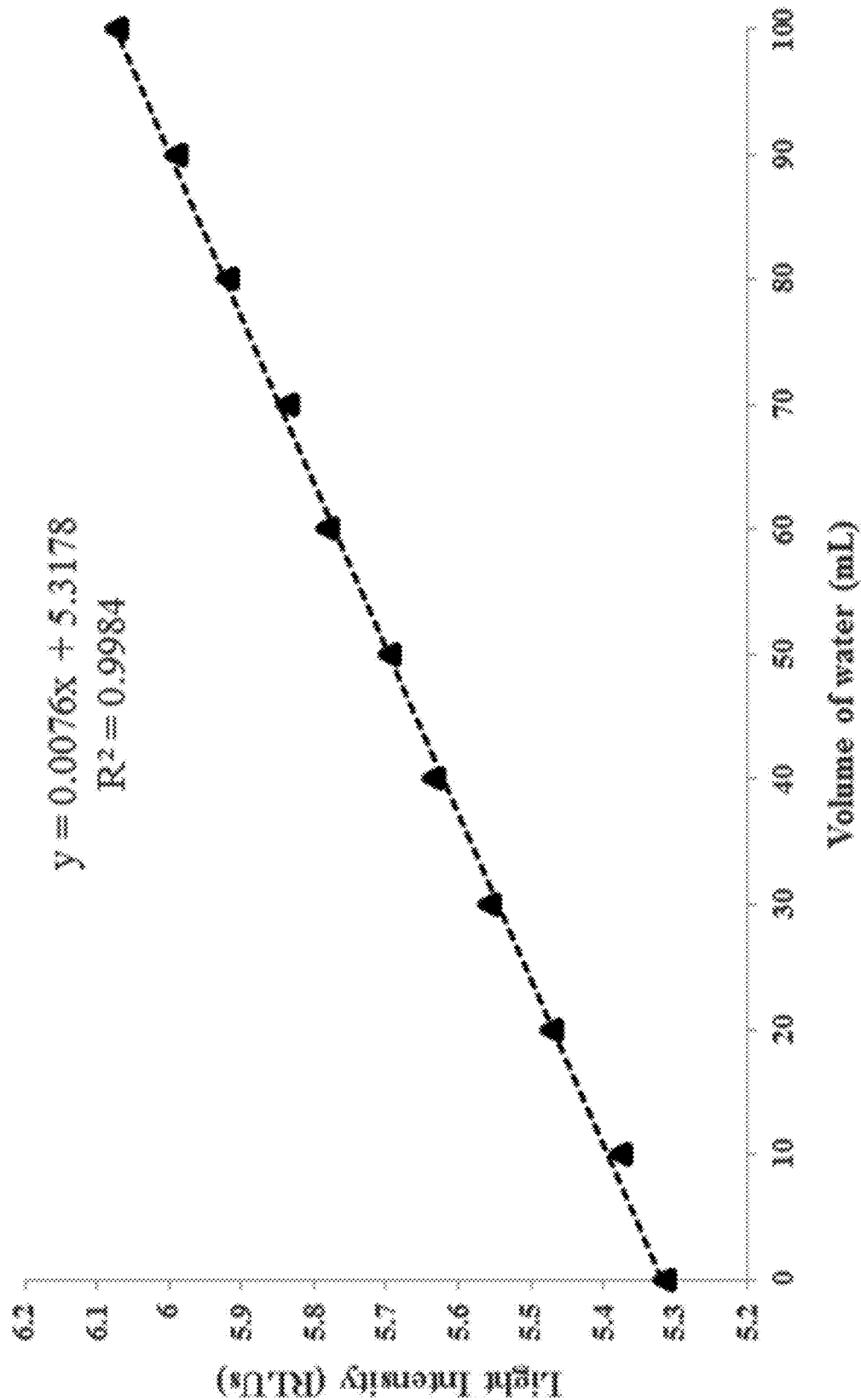
FIG. 4 is a graph depicting the relationship between light intensity and water volume using an embodiment of the present disclosure.

Example 2 with Reference to FIGS. 3 and 4—

In another example, water volume influence on light intensity was similarly measured, but using micron-size Cu-doped ZnS particles (phosphor particles) over the conductive side of an ITO glass as the electroluminescent device. To fabricate the electroluminescent device, a layer of phosphor particles 31 was deposited on the ITO glass 32 and the particles covered with a layer of dielectric tape 33. The electroluminescent device was placed inside a luminometer 34. The AC power source described above 35 was connected to the ITO glass by a single wire. A copper wire 36 was fixed over the dielectric layer using a round shape conductive copper tape 37 with the diameter of about 5 mm. The other end of the copper wire was fixed at the bottom of a micro-container 38, so that the electroluminescent device was at open-circuit. The intensity of the light generated by the electroluminescent device was measured by the luminometer and the results plotted over time. The light intensity of the open-circuit electroluminescent device with the empty micro-container was set as background. 2 µL of water was added to the micro-container and the change in the light intensity of the open-circuit electroluminescent device was recorded using the luminometer. Similarly, additional 2 µL increments of water were added to the micro-container and the change in the signal was recorded after each addition. Extracted data show a linear relationship in FIG. 4 between the intensity of the light from electroluminescent device and volume of the water added to the micro-container.

Figure 5:
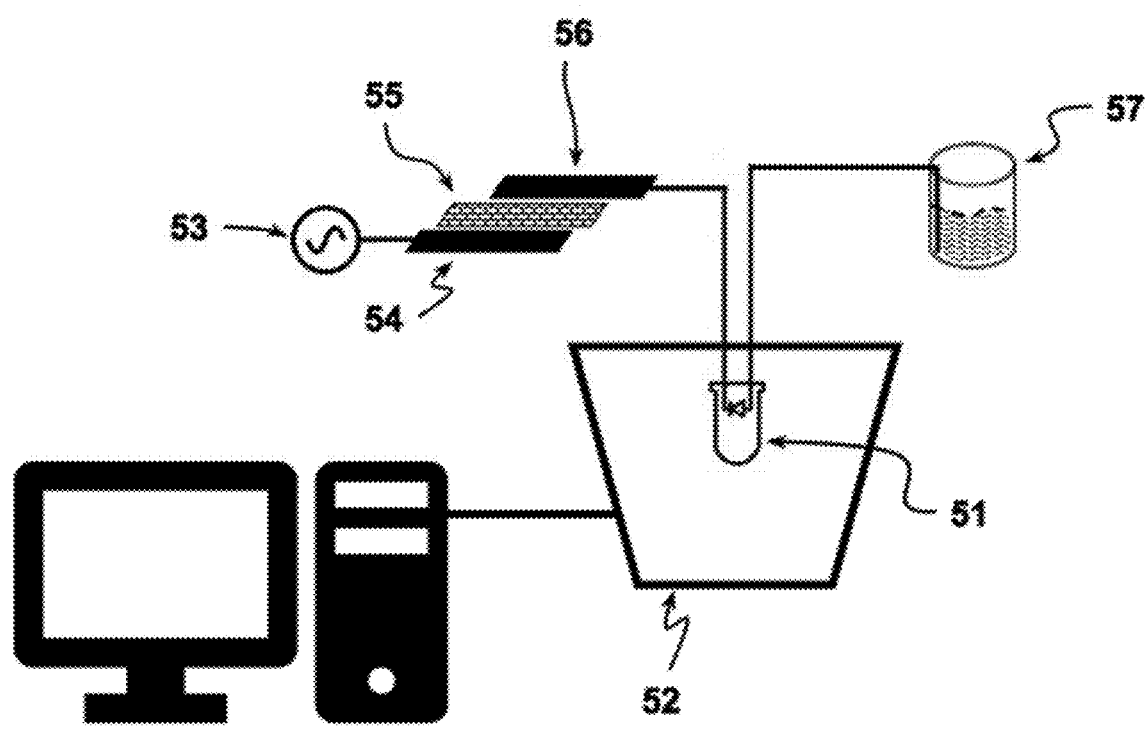
FIG. 5 is a diagram depicting an example embodiment of a system for producing electroluminescence in response to the amount of water in a container where electrical energy is interrupted by a dielectric layer.
Figure 6:
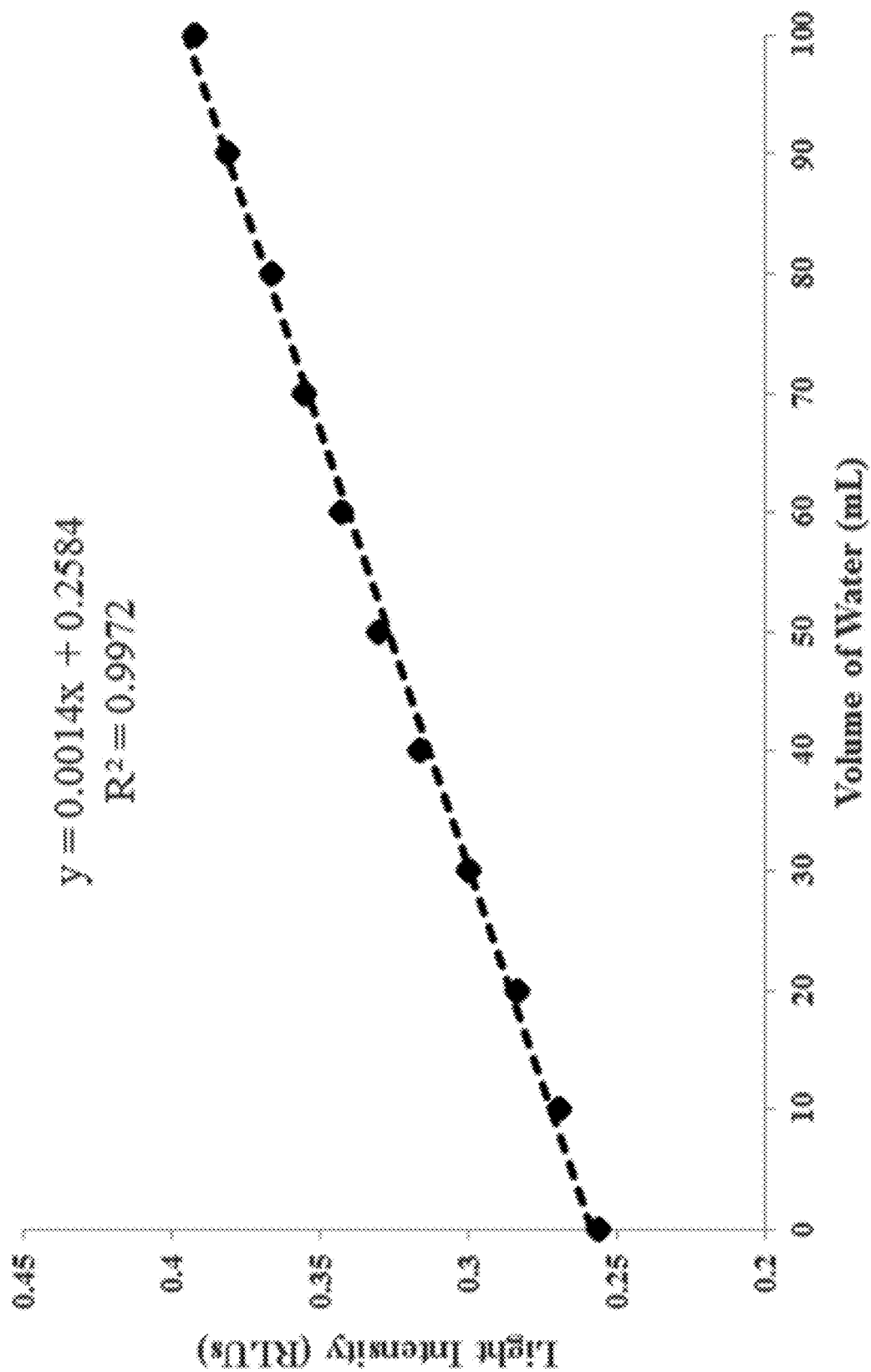
FIG. 6 is a graph depicting the relationship between light intensity and water volume using the experimental setup shown in FIG. 5.

Example 3 with Reference to FIGS. 5 and 6

In another embodiment, the effect of a water sample on light intensity was examined with a test system where the flow of electrical current from a source of time-varying electrical energy to an EL device is interrupted by a dielectric layer. To accomplish this, a red LED 51 used as the electroluminescent device was placed inside a luminometer 52. The AC power source described above 53 was connected by a single wire to a first metal strip 34. A layer of dielectric 55 was used to cover the first metal strip 54 and a second metal strip 56 was placed on top of dielectric layer 55. The second metal strip 56 was connected to one leg of LED 51. The other leg of LED 51 was fixed at the bottom of a micro-container 57, so that the electroluminescent device was at open-circuit. The intensity of the light generated by LED 51 was measured by luminometer 52 and plotted over time. The light intensity of the open-circuit electroluminescent device with the empty micro-container was set as background. 2 µL of water was added to micro-container 57 and the change in the light intensity of the open-circuit electroluminescent device was recorded using the luminometer. Extracted data show a linear relationship in FIG. 6 between the intensity of the light from electroluminescent device and volume of the water added to the micro-container.

Figure 7:
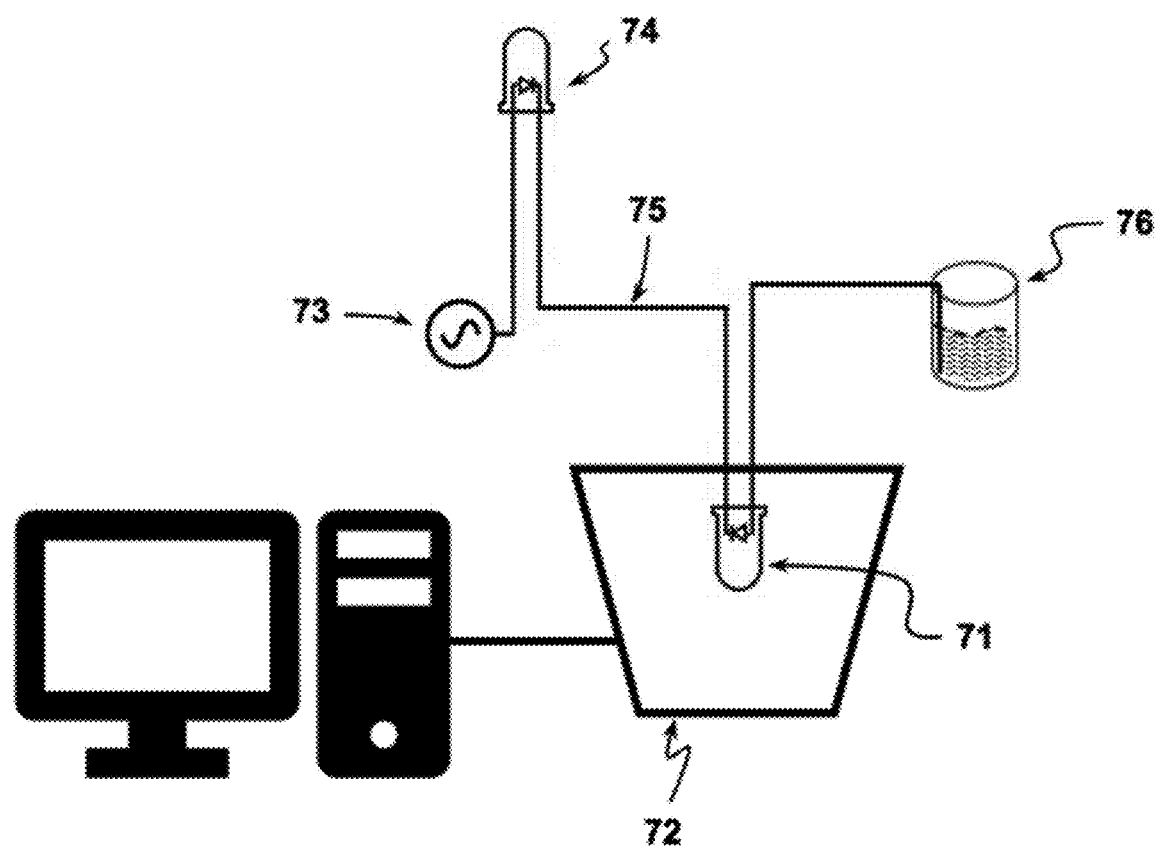
FIG. 7 is a diagram depicting an example embodiment of a system for producing electroluminescence in proportion to the amount of water in a container where electrical energy is supplied to two LEDs in series.

Example 4 with Reference to FIG. 7

In another embodiment, the effect of a water sample on light intensity was examined with a two LED system. A first red LED 71 was used as the electroluminescent device. The first LED was placed inside a luminometer 72. The AC power source described above 73 was connected by a single wire to one leg of a second red LED 74. A metal wire 75 was used to connect the other leg of second LED 74 to one leg of first LED 71. The other leg of the first LED was fixed at the bottom of a micro-container 76, so that the electroluminescent device was at open-circuit. The intensity of the light generated by the second LED was measured by the luminometer and plotted over time. The light intensity of the open-circuit electroluminescent device with empty micro-container 76 was set as background. 2 µL of water was added to micro-container 76 and the change in the light intensity of the open-circuit electroluminescent device was recorded using the luminometer. It should be noted that first LED 71 lights up as well.

Figure 8:
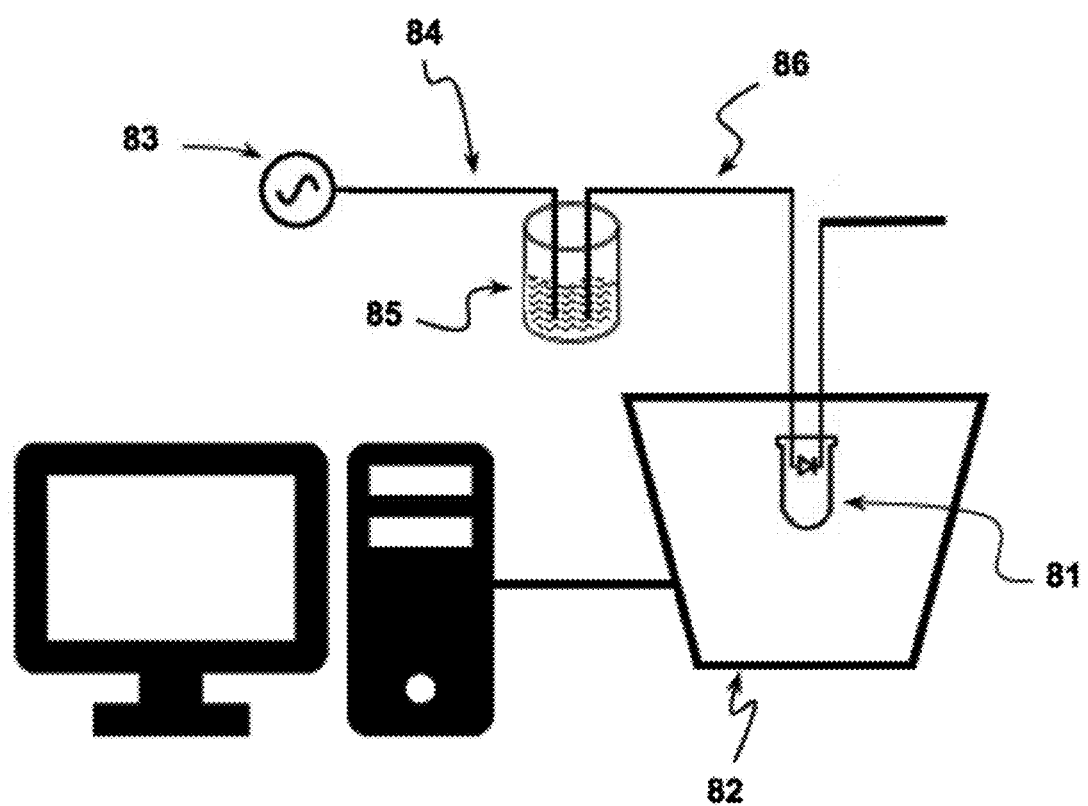
FIG. 8 is a diagram of an example embodiment of a system for producing electroluminescence in proportion to an analyte in a sample using transmission of electrical energy through the sample.

Example 5 with Reference to FIG.
8—Measurement of Concentration of Ionic Solutions In another embodiment, the method of the present disclosure was employed to perform measurements of the amount of a solute dissolved in a solution. A red LED 81 was used as the electroluminescent device. The LED was placed inside a luminometer 82. The AC power source 83 described above was connected to a single metal wire 84. The other end of metal wire 84 was fixed inside a container 85. One end of another metal wire 86 was also placed inside the container, so that the metal wire 84 and metal wire 86 are separated from each other and fixed at the same distance from the bottom of the container. The other end of metal wire 86 was connected to one leg of the LED. The other leg of the LED was not attached to anything so that the electroluminescent device was at open-circuit. A set of serial dilutions of aqueous solution of NaCl was prepared with the concentration of NaCl ranging from 1M to $10^{-6}$ M. 100 µL of the $10^{-6}$M NaCl solution was added to the container so that ends of wire 84 and wire 86 were in contact with the solution. The resulting light intensity of the electroluminescent device was recorded using the luminometer. Similarly, the intensity of the light of the electroluminescent device was recorded for different concentrations of NaCl. Light intensity produced varied in proportion to the concentration of NaCl.

Figure 9:
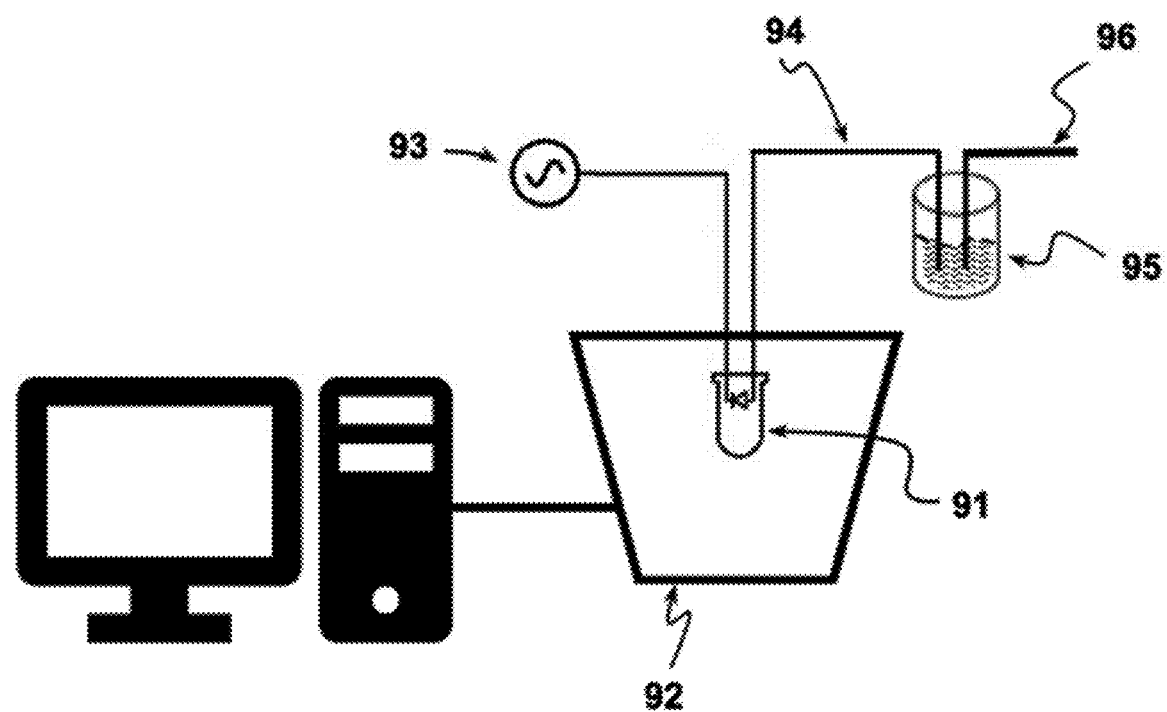
FIG. 9 is a diagram of an example embodiment of a system for producing electroluminescence in proportion to an analyte in a sample.

Example 6 with Reference to FIG.
9—Measurement of Enzyme Activity

In another embodiment, the method of the present disclosure was employed to perform an assay of the activity of an enzyme on a substrate. A red LED 91 was used as the electroluminescent device. The LED was placed inside a luminometer 92. The AC power source 93 described above was connected by a single wire to a one leg of LED 91. The other leg of LED 91 was connected to one end of a first metal wire 94. The other end of first metal wire 94 was fixed inside a container 95. One end of a second metal wire 96 was also placed inside container 95, so that first metal wire 94 and the second metal wire 96 are separated from each other and fixed at the same distance from the bottom of container 95.

The other end of second metal wire 96 was not attached to anything so that the electroluminescent device was at open-circuit.

A set of enzymatic reactions was prepared separately by mixing two solutions. Solution 1 is a working solution of known concentration of an enzyme substrate (ethyl acetate) in water. Solution 2 was one of a set of serial dilutions of aqueous solution of an enzyme (esterase), with an enzyme concentration ranging from 10 mg/mL to 1 µg/mL. Reaction of the enzyme with the substrate ethyl acetate converts it into ethanol and acetate. 100 µL of the set enzymatic reaction between the substrate and the 1 µg/mL enzyme was added to the container and the light intensity of the electroluminescent device was recorded using the luminometer. Similarly, reaction solutions were prepared using each enzyme dilution and the light intensity of the electroluminescent device was recorded for each enzymatic reaction. Light intensity produced varied in proportion to the concentration of enzyme.

Example 7 with Reference to FIG. 8—Alternative Measurement of Enzyme Activity

In another embodiment, the method of the present disclosure was employed to perform an assay of the activity of an enzyme on a substrate. In this variation, the assay sample was placed between the power supply and the EL device. A red LED 81 was used as the electroluminescent device. The LED was placed inside a luminometer 82. The AC power source 83 described above was connected to a first metal wire 84. The other end of first metal wire 84 was fixed inside a container 85. One end of a second metal wire 86 was also placed inside container 85, so that first metal wire 84 and second metal wire 86 are separated from each other and fixed at the same distance from the bottom of container 85. The other end of second metal wire 86 was connected to one leg of LED 81. The other leg of LED 81 was not attached to anything so that the electroluminescent device was at open-circuit. A set of enzymatic reactions were prepared separately by mixing solution 1 and solution 2, where solution 1 was a working solution of known concentration of an enzyme substrate (ethyl acetate) and solution 2 was a serial dilution of aqueous solution of an enzyme (esterase), with an enzyme concentration ranging from 10 mg/mL to 1 µg/mL. 100 µL of the set enzymatic reaction between the substrate and the 1 µg/mL enzyme was added to container 85 and the light intensity of the electroluminescent device was recorded using the luminometer. Similarly, the intensity of the light of the electroluminescent device was recorded for different set enzymatic reactions with different concentrations of the enzyme. Light intensity produced varied with the concentration of enzyme.

Figure 10:
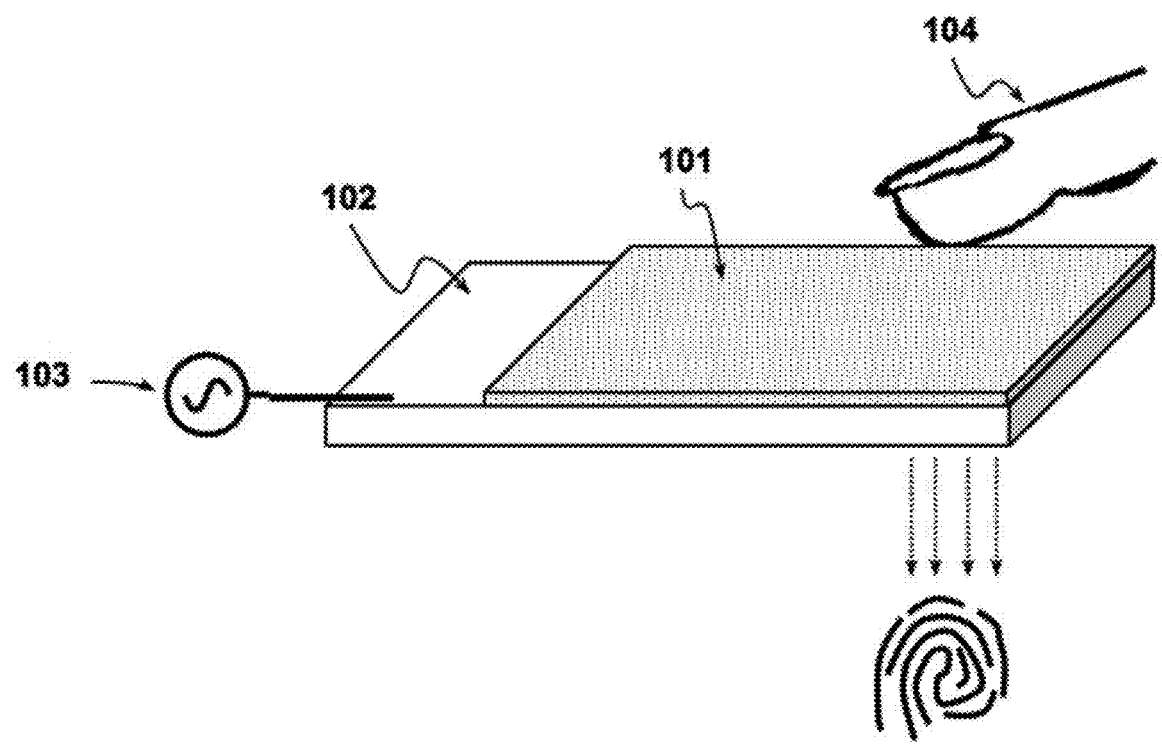
FIG. 10 is s a diagram of an example embodiment having a planar electroluminescent device for obtaining images of objects placed in contact.
Figure 11:
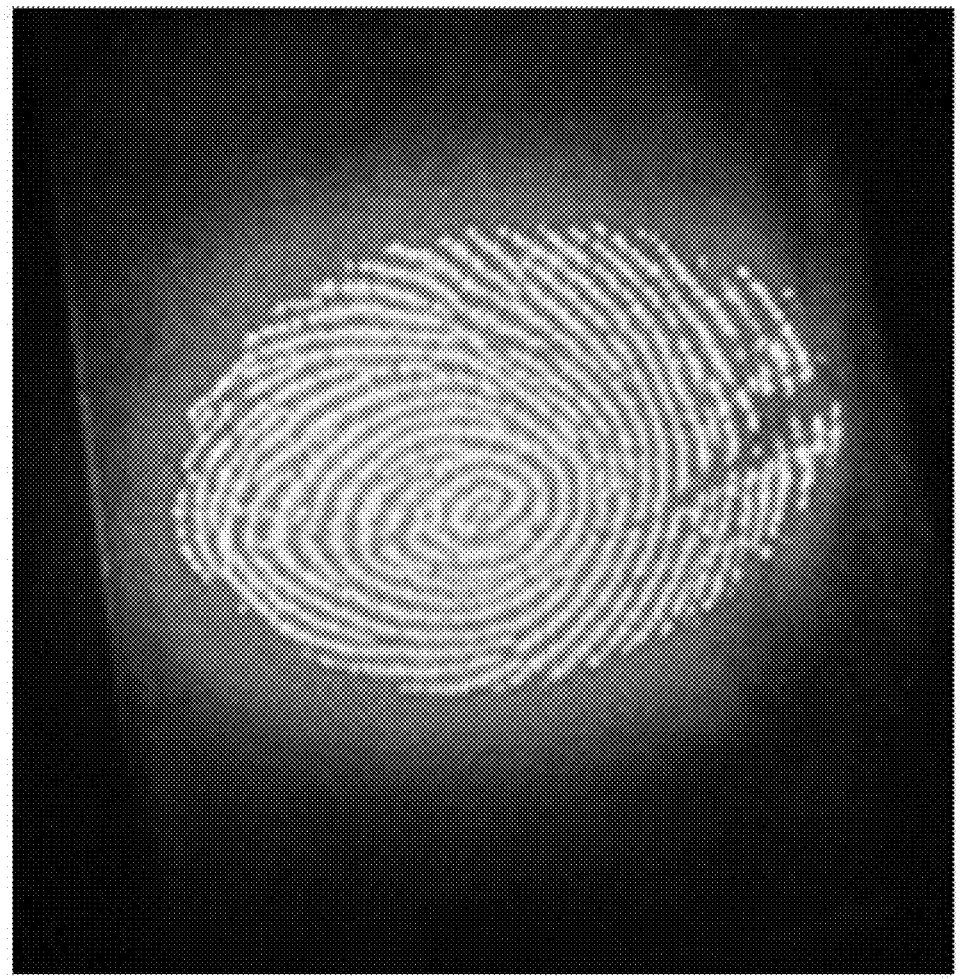
FIG. 11 is an image of a fingerprint obtained with the device of FIG. 10.

Example 8 with Reference to FIGS. 10 and 11

In another embodiment, an imaging sensor having dielectric-embedded phosphor particles coated on ITO glass was used to obtain fingerprints. To prepare the device, micron-size Cu-doped ZnS particles (GG64) (Osram Sylvania Inc.) and Silicone elastomer curing agent were combined to form a "mixture" 101. The mixture 101 was dispersed on the conductive side of an ITO glass 102 and cured for 30 minutes at 70° C. to form a dielectric-embedded phosphor layer over the ITO glass. The AC power source 103 described above was connected by a single wire to ITO glass 102. A luminescent fingerprint shown in FIG. 11 was observed on mixture 101 through ITO glass 102, upon placing a finger 104 on cured mixture 101. An image of the fingerprint was made with a CCD camera facing on the opposite side of the ITO glass.

Figure 12:
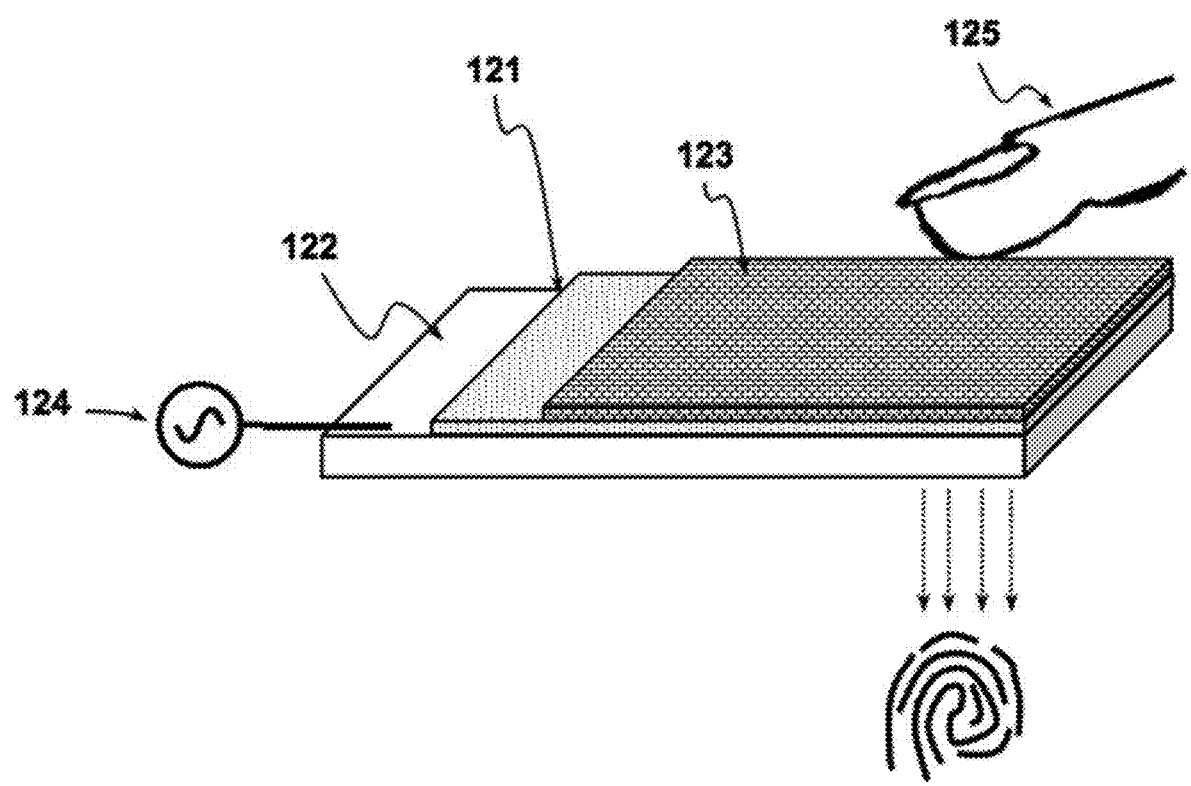
FIG. 12 is s a diagram of an example embodiment having a planar electroluminescent device with a dielectric layer for obtaining images of objects placed in contact.
Figure 13:
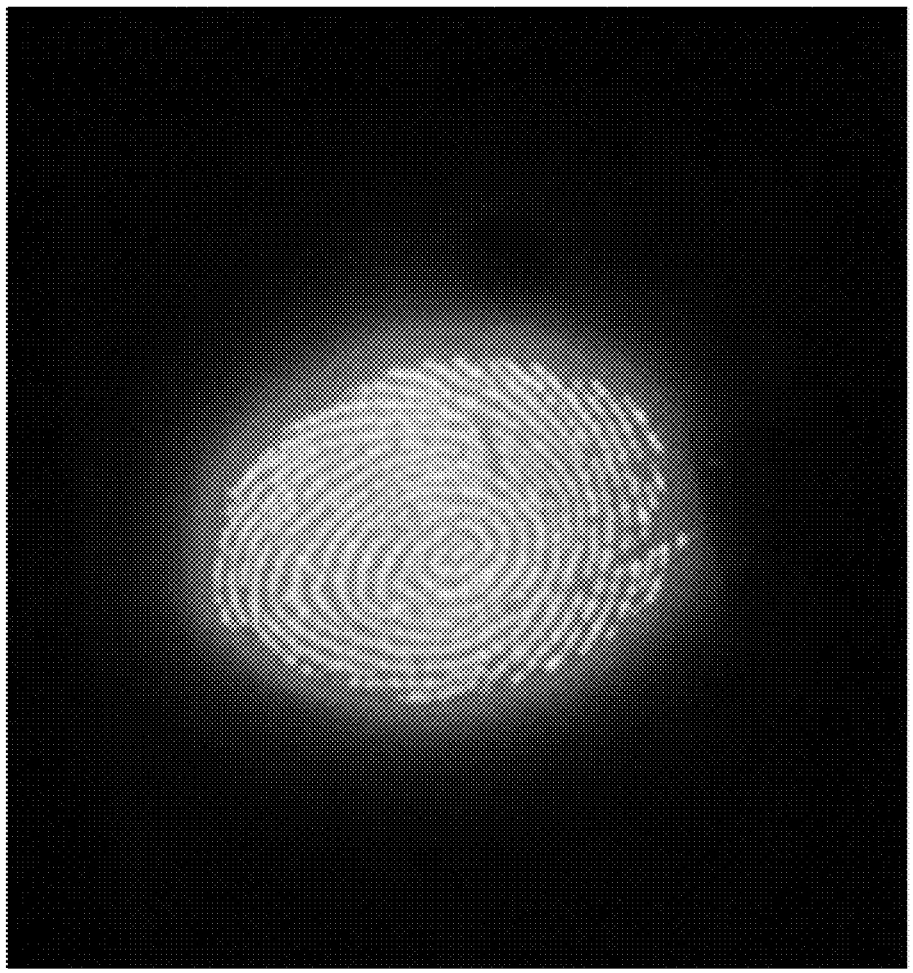
FIG. 13 is an image of a fingerprint obtained with the device of FIG. 12.

Example 9 with Reference to FIGS. 12 and 13

In another embodiment, an imaging sensor having dielectric-embedded phosphor nanoparticles coated on ITO glass with a dielectric overlayer was used to obtain fingerprints. To prepare the device, a dispersion of 5 nm Mn-doped ZnS nanoparticles designated JS-43 prepared by the method disclosed in US 2018/0051209 was prepared in water. A layer of nanoparticles 121 was deposited on the conductive side of an ITO glass 122 by drying the suspension over the ITO glass. A layer of dielectric 123 such as a vinyl or nitrile rubber film, covered nanoparticle layer 121. The AC power source 124 described above was connected to ITO glass 122. A luminescent fingerprint shown in FIG. 13 was observed on nanoparticles layer 121 through ITO glass 122, upon placing a finger 125 on dielectric layer 123. An image of the fingerprint was made with a CCD camera facing on the opposite side of the ITO glass.

Figure 14:
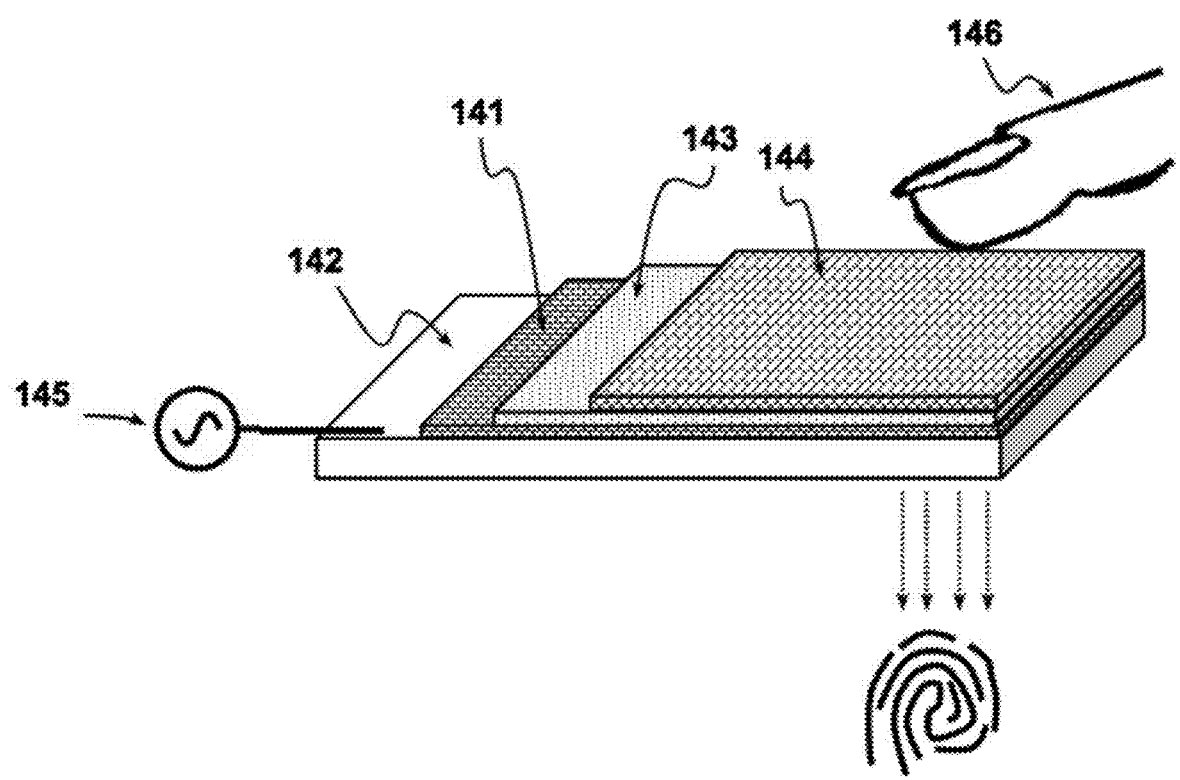
FIG. 14 is s a diagram of an example embodiment having a planar electroluminescent device with two dielectric layers for obtaining images of objects placed in contact.
Figure 15:
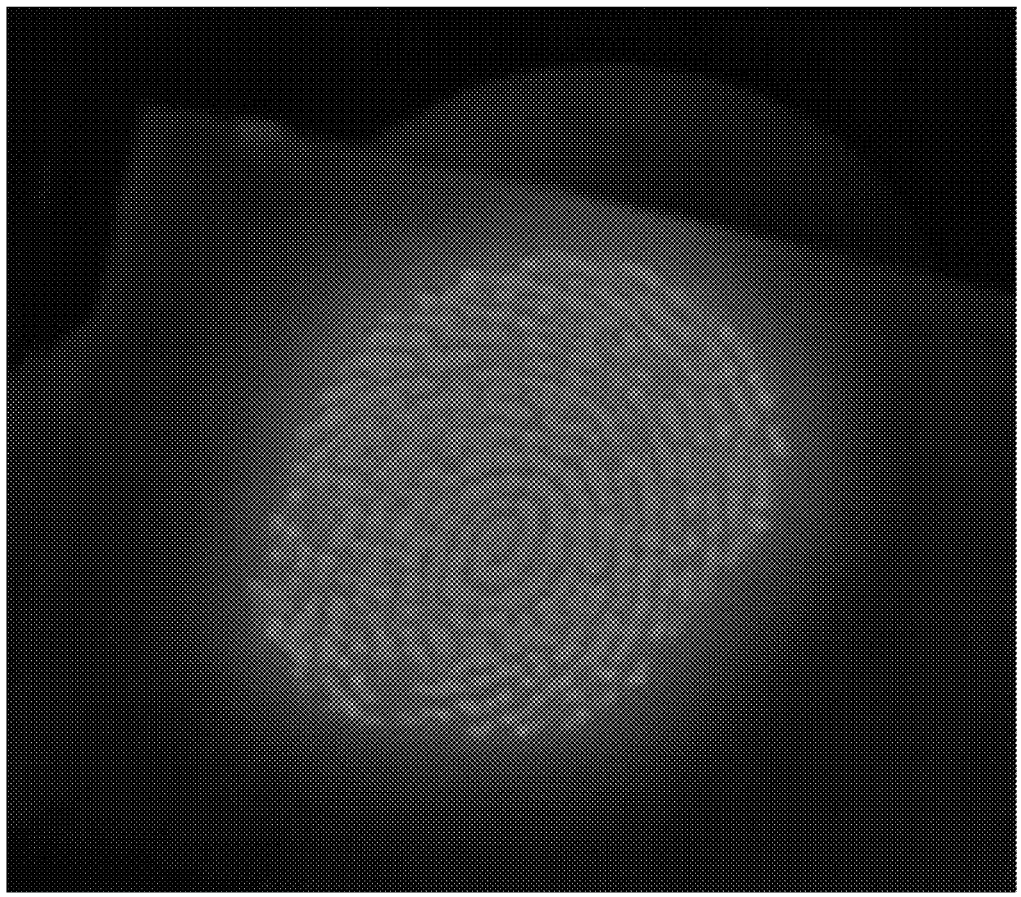
FIG. 15 is an image of a fingerprint obtained with the device of FIG. 14.

Example 10 with Reference to FIGS. 14 and 15

In another embodiment, an imaging sensor having phosphor particles sandwiched between two dielectric layers coated on ITO glass was used to obtain fingerprints. To prepare the device, a first dielectric layer (barium titanate in commercial binder resin, or a thin polymer layer) 141 was coated on ITO glass 142. A layer of GG64 particles 143 was deposited on first dielectric layer 141, followed by depositing a second dielectric layer 144 over phosphor material layer 143. The AC power source 145 described above was connected by a single wire to ITO glass 142. A luminescent fingerprint shown in FIG. 15 was observed on phosphor material layer 143 through ITO glass 142, upon placing a finger 146 on dielectric layer 144.

Figure 16:
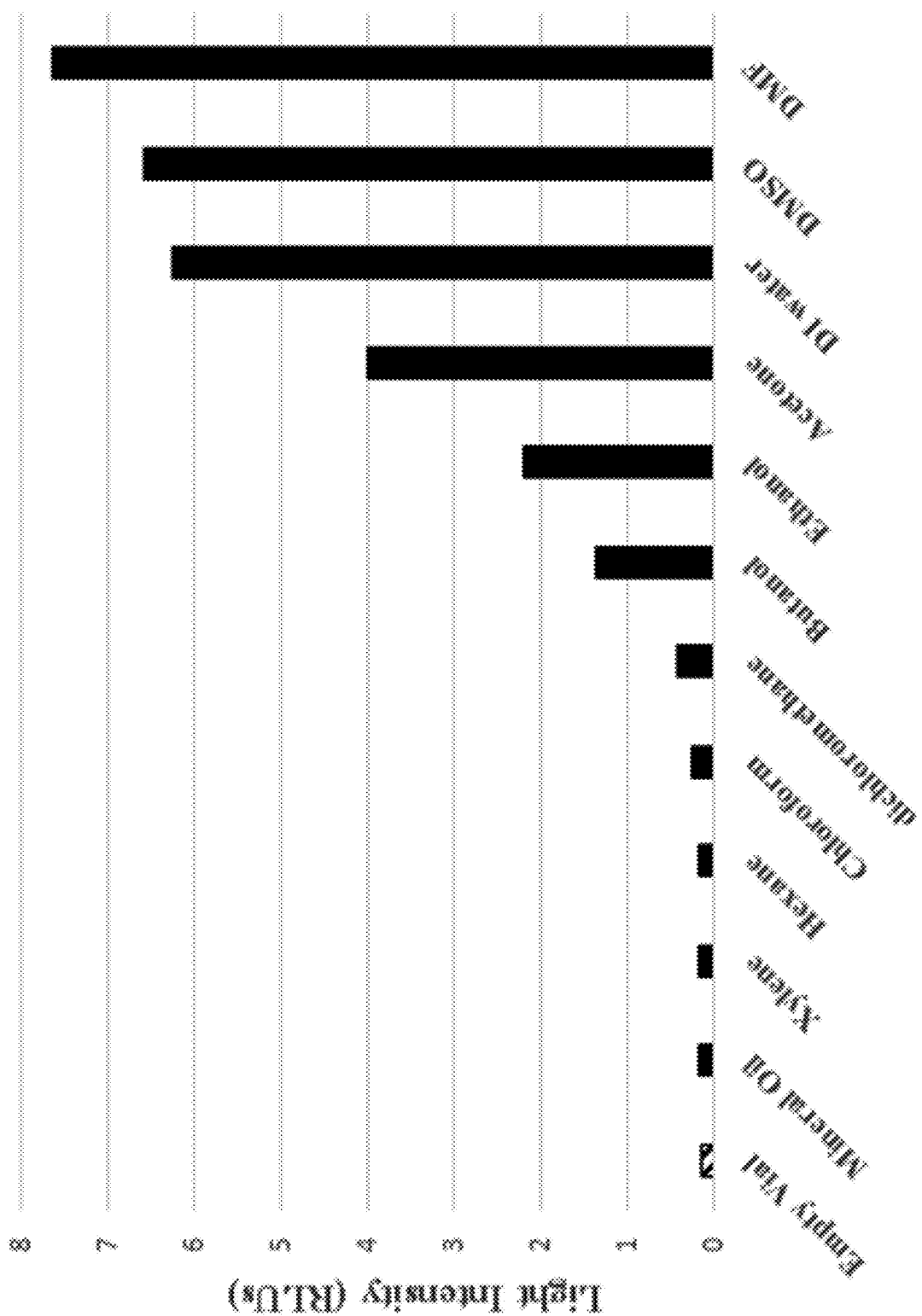
FIG. 16 is a graph showing the influence of various liquids on light emission.

Example 11 with Reference to FIG. 16

In another embodiment, the effect of different substances on light emission was examined. A red LED 161 was used as the electroluminescent device. LED 161 was placed inside a luminometer 163, with one leg of the LED connected by a single wire to AC power source 162 described above. The other leg of the LED was fixed at the bottom of a micro-container 164, so that the electroluminescent device was at open-circuit. The intensity of the light generated by the LED was measured by the luminometer and plotted over time. The light intensity of the open-circuit electroluminescent device with empty micro-container 164 was set as background. A set of different solvents was used as the object or substance that increase the electric field. For each solvent from the set of different solvents, 5 mL of the solvent was added to container 164 and the light intensity of the open-circuit electroluminescent device was recorded using the luminometer. The results shown in FIG. 16 and Table 1 show that light intensity increases with increasing polarity of the material.

TABLE 1

| Light Intensity Produced with Different Liquid | |
|---|---|
| Solvent | Luminometer reading (RLUs) |
| Empty Vial (BG) | 0.1385 |
| Mineral Oil | 0.175 |
| Xylene | 0.178 |

TABLE 1-continued

Light Intensity Produced with Different Liquid

| Solvent | Luminometer reading (RLUs) |
| --- | --- |
| Hexane | 0.19 |
| Chloroform | 0.2741 |
| Dichloromethane | 0.429 |
| Butanol | 1.381 |
| Ethanol | 2.193 |
| Acetone | 4.021 |
| DI water | 6.25 |
| DMSO | 6.58 |
| DMF | 7.64 |

Figure 17:
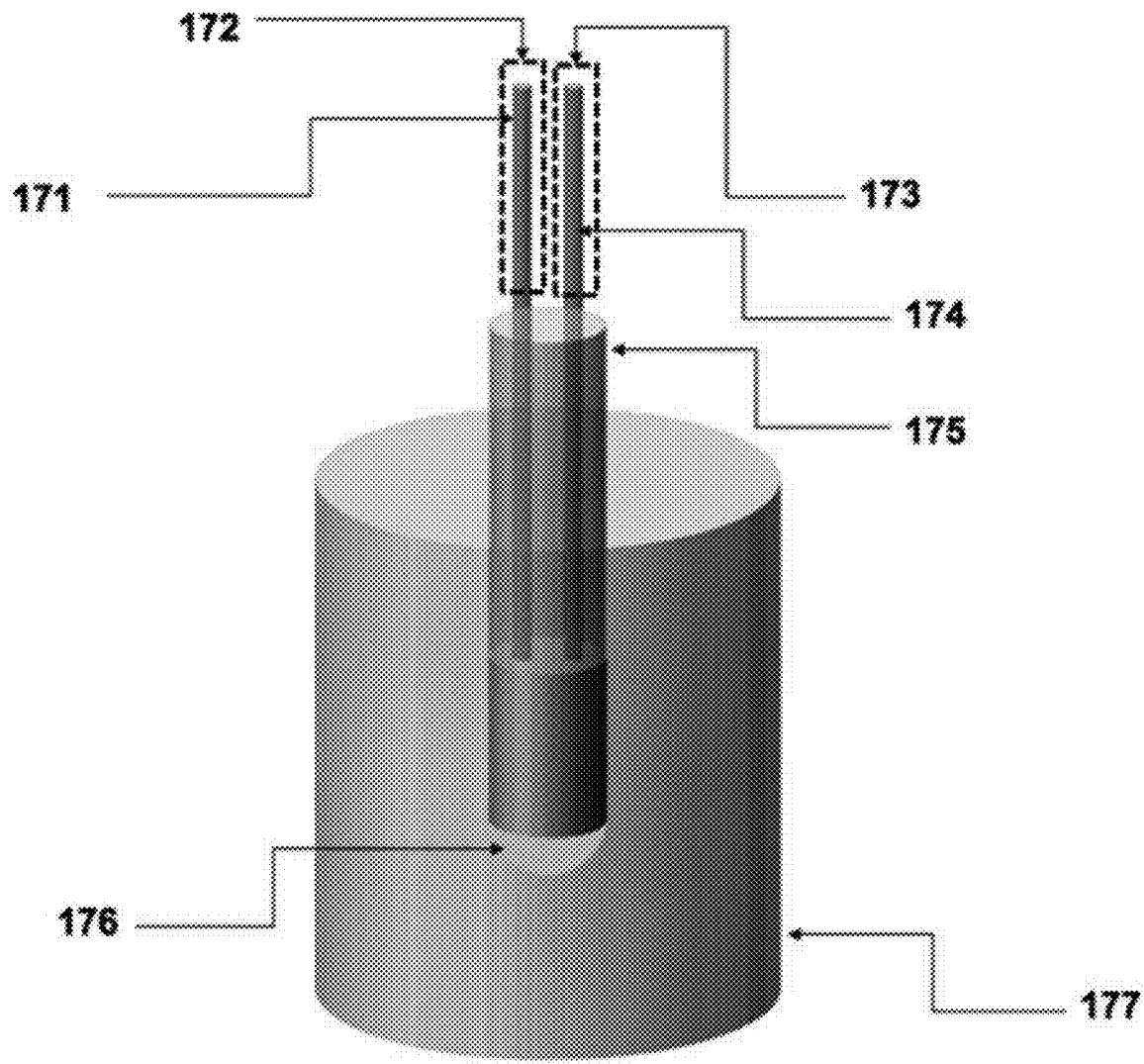
FIG. 17 is a diagram of a device for producing electroluminescence using a commercial LED immersed in a conductive medium.

Example 12 with Reference to FIG. 17

In these embodiments, EL devices were excited in a conductive medium using a device depicted in FIG. 17.

In these embodiments, an insulated LED was submerged in water. The water may optionally contain minerals for enhanced conductivity. The LED leads were connected via insulated wires to a time-varying power supply on one end and to a ground on the other. In each of the alternative embodiments in this example, the object that increases the electric field is the water bath and an optional second object connected to the EL device directly. Light intensity produced is correlated to the presence and size of the field-increasing object(s). The following combinations were tested and produced electroluminescent light:

A. Both LED leads were connected directly to a time-varying power supply and a material or substance that enhances electric field across the EL device. As shown in FIG. 17, the LED legs 171 and 174 are connected directly to a material or substance that enhances electric field across the EL device and the AC power source described above, without a dielectric layer 172 and 173. A water-insulation layer 175 separates the LED 176 from the water bath 177.

B. Both LED leads were connected to a time-varying power supply and a material or substance that enhances electric field across the EL device via dielectric layers. In this embodiment, the LED legs 171 and 174 were connected to a material or substance that enhances electric field across the EL device and the AC power source described above, via a dielectric layer 172 and 173, respectively. A water-insulation layer 175 separated the LED 176 from the water bath 177.

C. One LED lead was directly connected to the time-varying power supply while the other lead was connected to a material or substance that enhances electric field across the EL device via a dielectric layer. In this embodiment, the LED leg 171 was connected directly to the AC power source described above, without a dielectric layer 172, while the other LED leg 174 was connected to a material or substance that enhances electric field across the EL device via a dielectric layer 173. A water-insulation layer 175 separated the LED 176 from the water bath 177.

D. One LED lead was directly connected to a material or substance that enhances electric field across the EL device while the other lead was connected to the time-varying power supply via a dielectric layer. In this embodiment, the LED leg 171 was connected directly to a material or substance that enhances electric field across the EL device, without a dielectric layer 172, while the other LED leg 174 was connected to the AC power source described above via a dielectric layer 173. A water-insulation layer 175 separated the LED 176 from the water bath 177.

E. All components were insulated and submerged in water. In this embodiment, the LED legs 171 and 174 were connected to a material or substance that enhances electric field across the EL device and the AC power source described above, via a dielectric layer 172 and 173. A water-insulation layer 175 separated the LED 176 from the water bath 177.

Figure 18:
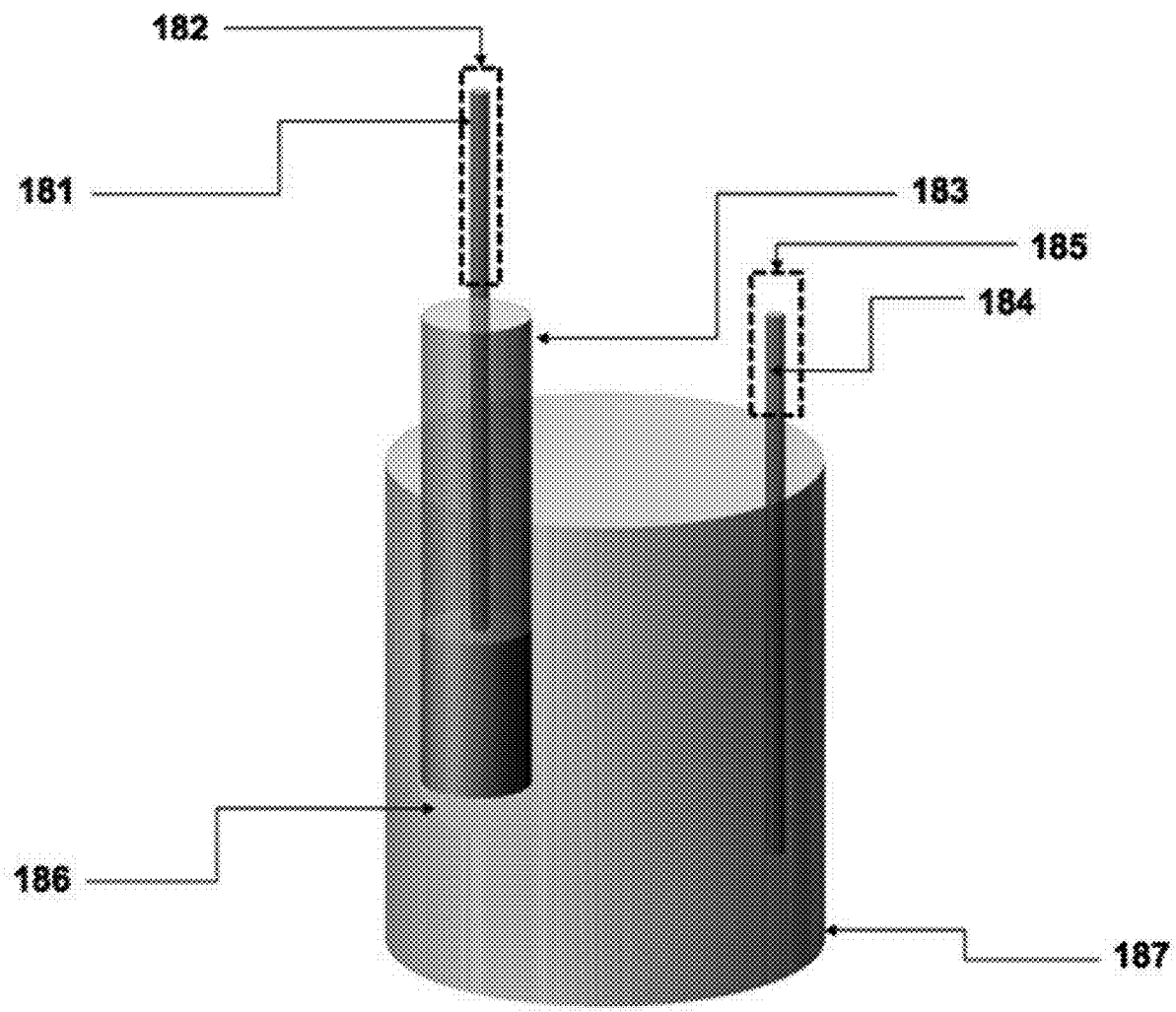
FIG. 18 is a diagram of a device for producing electroluminescence using a phosphor-coated electrode immersed in a conductive medium.

Example 13 with Reference to FIG. 18

In these embodiments, EL devices were excited in a conductive medium using a device depicted in FIG. 18.

In these embodiments, commercial phosphor material was applied directly onto the exposed tip of an otherwise insulated electrode. The phosphor material was then coated with barium titanate dielectric layer and air-dried. The phosphor-coated electrode was submerged in water. The device used for these embodiments is illustrated in FIG. 18. In each of the alternative embodiments in this example, the object that increases the electric field is the water bath and an optional second object connected to the EL device directly or indirectly through the water bath. Light intensity produced is correlated to the presence and size of the field-increasing object(s). The following combinations were tested and produced light.

A. The insulated electrode was directly connected to an external ground while the water bath was energized. As shown in FIG. 18, the electrode 181 attached to an EL layer 186 is insulated from water 183 and is directly connected to a body without a dielectric layer 182. The water bath 187 is connected by a single wire to the AC power source described above via an electrode 184 without a dielectric 185.

B. insulated electrode was connected to an external ground via a dielectric layer while the water bath was energized. As shown in FIG. 18, the electrode 181 attached to an EL layer 186 is insulated from water 183 and is connected to a body via a dielectric layer 182. The water bath 187 is connected to the AC power source described above by a single wire via an electrode 184 without a dielectric 185.

C. The insulated electrode was directly connected to an external time-varying power supply while the water bath was grounded. As shown in FIG. 18, the electrode 181 attached to an EL layer 186 is insulated from water 183 and is directly connected by a single wire to the AC power source described above without a dielectric layer 182. The water bath 187 is connected to a body via an electrode 184 without a dielectric 185.

D. The insulated electrode was connected by a single wire to an external time-varying power supply via a dielectric layer while the water bath was grounded. As shown in FIG. 18, the electrode 181 attached to an EL layer 186 is insulated from water 183 and is connected by a single wire to the AC power source described above via a dielectric layer 182. The water bath 187 is connected to a body via an electrode 184 without a dielectric 185.

Figure 19:
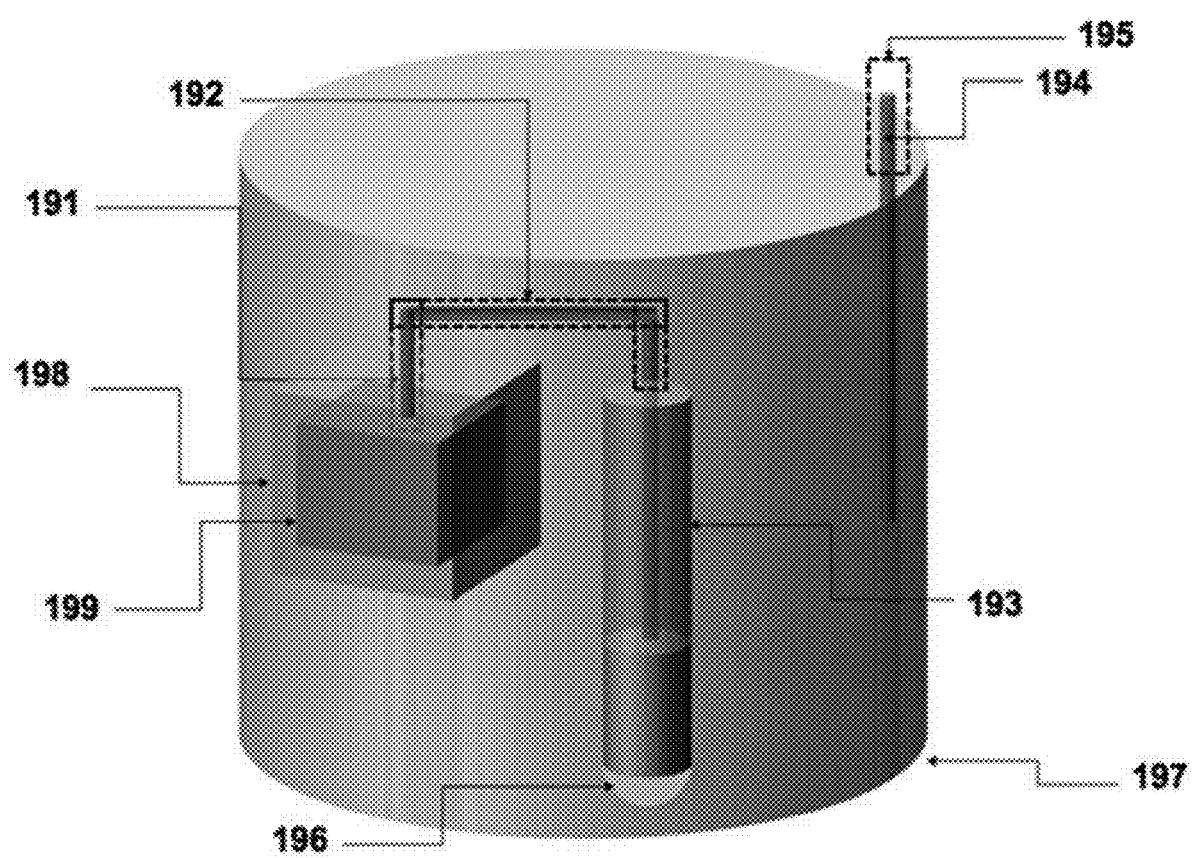
FIG. 19 is a diagram of a device for producing electroluminescence using a phosphor-coated electrode with the power supply and/or electric field-increasing body also immersed in a conductive medium.

Example 14 with Reference to FIG. 19

In these embodiments, EL devices were excited in a conductive medium using a device depicted in FIG. 19.

In these embodiments, commercial phosphor material was applied directly onto the exposed tip of an otherwise insulated electrode. The phosphor material was then coated with barium titanate dielectric layer and air-dried. The phosphor-coated electrode was submerged in water. The device used for these embodiments is illustrated in FIG. 19. In each of the alternative embodiments in this example, the object that increases the electric field is the water bath and an optional second object connected to the EL device directly or indirectly through the water bath. Light intensity produced is correlated to the presence and size of the field-increasing object(s). The following combinations were tested and produced light.

A. The insulated electrode was directly connected to an insulated ground in water while the water bath was energized. In the schematic below, the electrode 191 attached to an EL layer 196 is insulated from water 193 and is connected to body 199 without a dielectric layer 192. Body 199 is stored in a water-sealed container 198. The water bath 197 is connected to the AC power source described above by a single wire via an electrode 194 without a dielectric 195.

B. The insulated electrode was connected to an insulated ground in water via a dielectric layer while the water bath was energized. In the schematic below, the electrode 191 attached to an EL layer 196 is insulated from water 193 and is connected to body 199 via a dielectric layer 192. Body 199 is stored in a water-sealed container 198. The water bath 197 is connected by a single wire to the AC power source described above (not shown) via an electrode 194 without a dielectric 195.

C. The insulated electrode was directly connected to an insulated power supply in water while the water bath was grounded. In the schematic below, the electrode 191 attached to an EL layer 196 is insulated from water 193 and is connected by a single wire to the AC power source described above 199 via a dielectric layer 192. The power source is stored in a water-sealed container 198. The water bath 197 is connected to a body via an electrode 194 without a dielectric 195.

D. The insulated electrode was connected to an insulated power supply in water via a dielectric layer while the water bath was grounded. In the schematic below, the electrode 191 attached to an EL layer 196 is insulated from water 193 and is connected by a single wire to the AC power source described above 199 via a dielectric layer 192. The power source is stored in a water-sealed container 198. The water bath 197 is connected to a body via an electrode 194 without a dielectric 195. The water bath and the EL device are connected (directly or via a dielectric layer) to a water-sealed body and the water-sealed power source which are all submerged in water.

Figure 20:
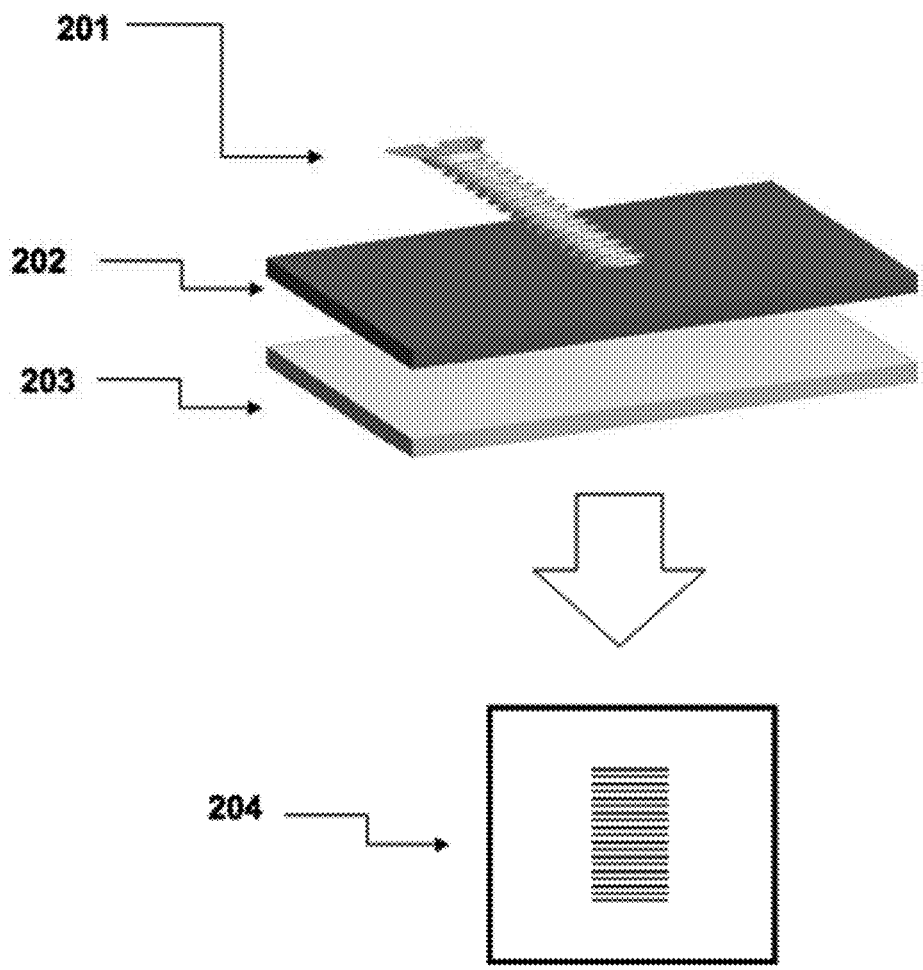
FIG. 20 is a diagram of a portion of an EL device of the invention used to image an object and having a phosphor layer on a transparent electrode.

Example 15 with Reference to FIG. 20

Various combinations of electrode, EL layer, and dielectric layer were examined in preparing a planar EL device for use in single wire methods. In one embodiment, a conductive body 201 is connected directly onto an EL layer 202. The EL layer sits directly on top of a transparent electrode 203 that is connected by a single wire to a time-varying power supply by a single wire. No dielectric layer is applied between the EL layer and the electrode. As shown in FIG. 20, upon excitation, a pattern 204 appears due to local enhancement by the presence of conductive body 201.

Figure 21:
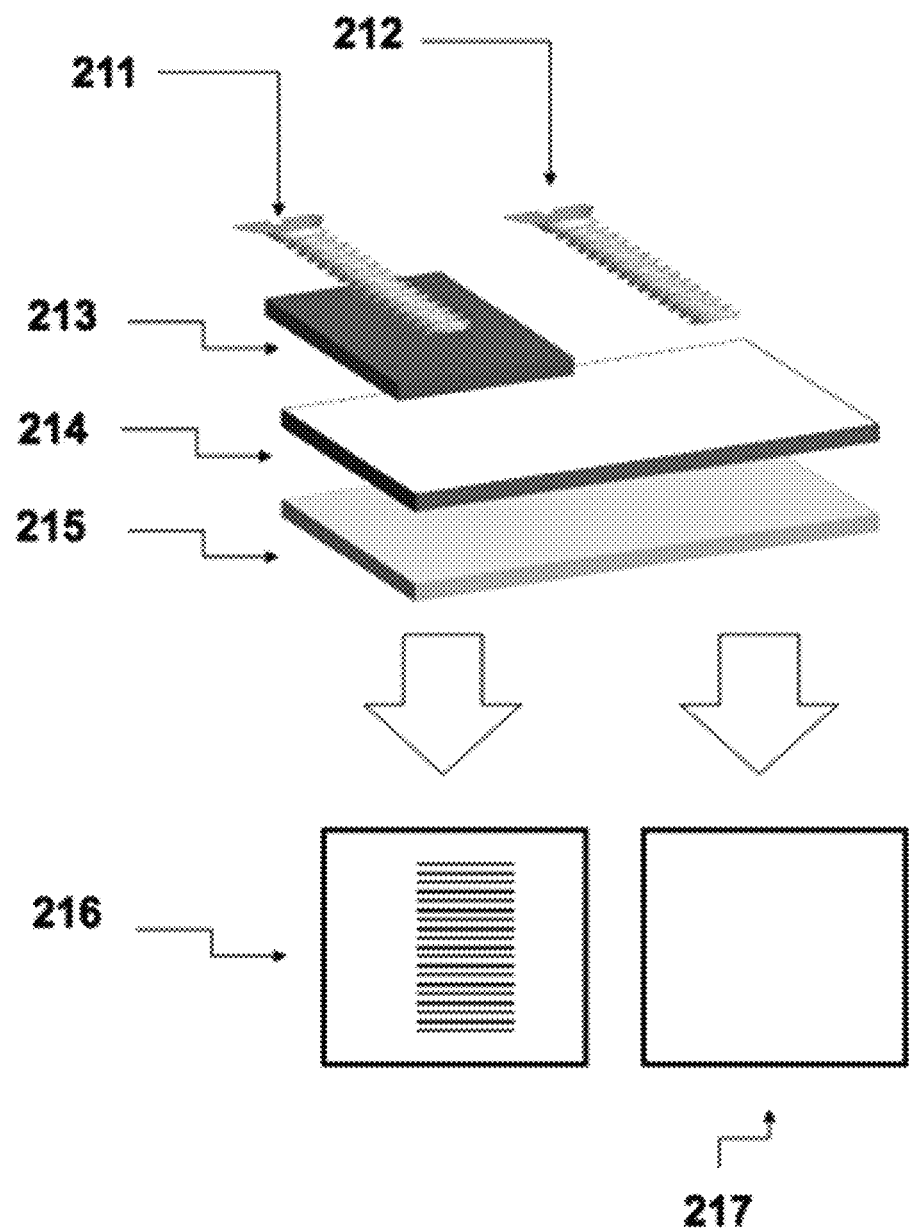
FIG. 21 is a diagram of a portion of an EL device of the invention used to image an object and having a phosphor layer on a portion of a dielectric layer-coated transparent electrode.

Example 16 with Reference to FIG. 21

In another embodiment, a dielectric layer 214 of $BaTiO_3$ is placed on a surface of the transparent electrode 215 that is connected to a time-varying power supply by a single wire. Then an EL layer 213 is placed over a portion of the dielectric layer. Two bodies 211 and 212 are connected directly onto the top surface of EL device as depicted in FIG. 21. The setup with the EL layer results in an emitting pattern 216 due to local enhancement by the presence of body 21. On the other hand, in the setup with no EL layer, no emission is observed 217.

Figure 22:
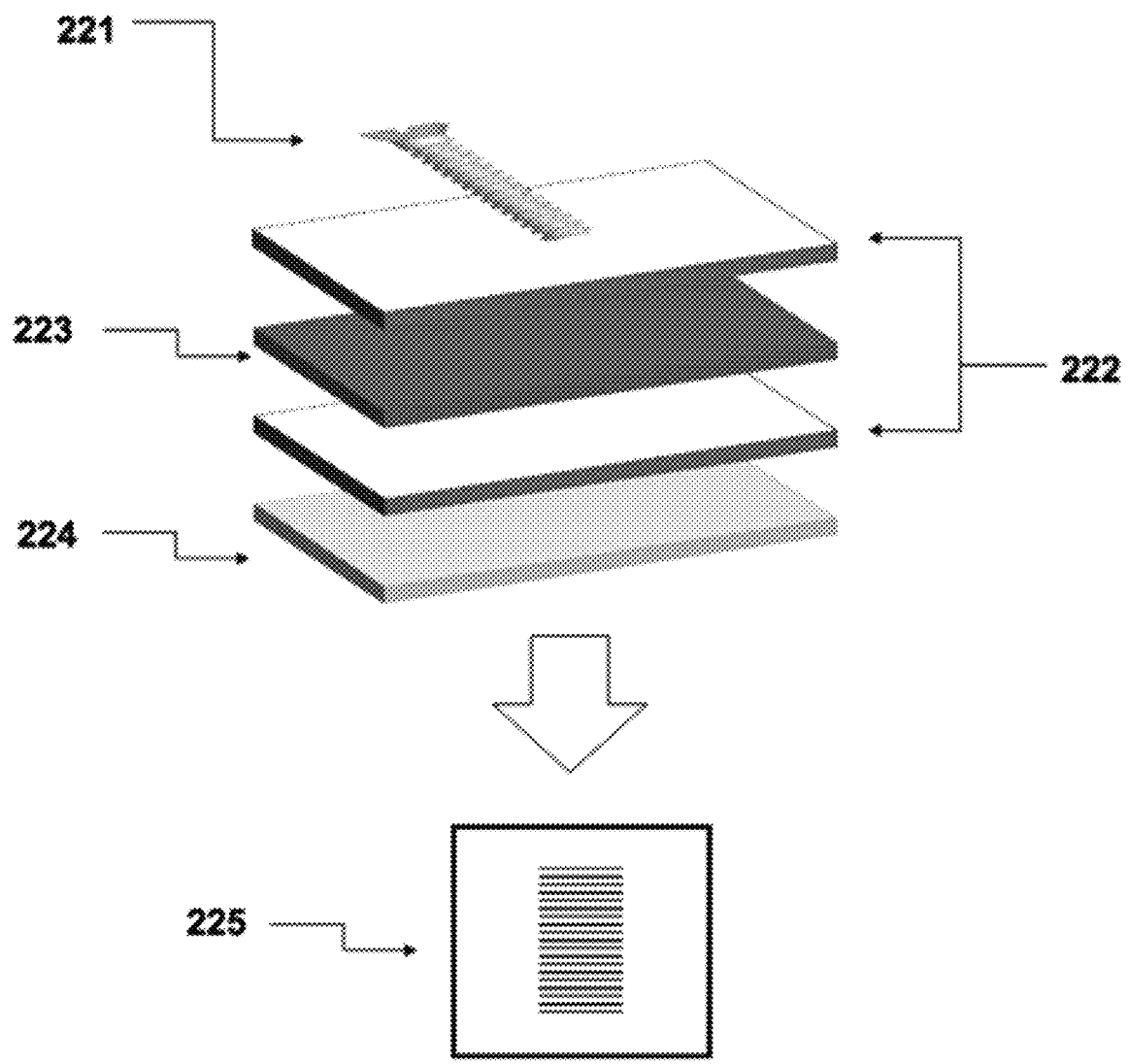
FIG. 22 is a diagram of a portion of an EL device of the invention used to image an object and having a phosphor layer sandwiched between dielectric layers on a transparent electrode.

Example 17 with Reference to FIG. 22

In this embodiment, body 221 is connected to an EL device where two dielectric layers 222 sandwich an EL layer 223 between them. The system of the dielectric layers and the EL layer is laid over a transparent electrode 224 that is connected to a time-varying power supply by a single wire. Upon excitation, a pattern 225 appears due to local enhancement by the presence of body 221.

Figure 23:
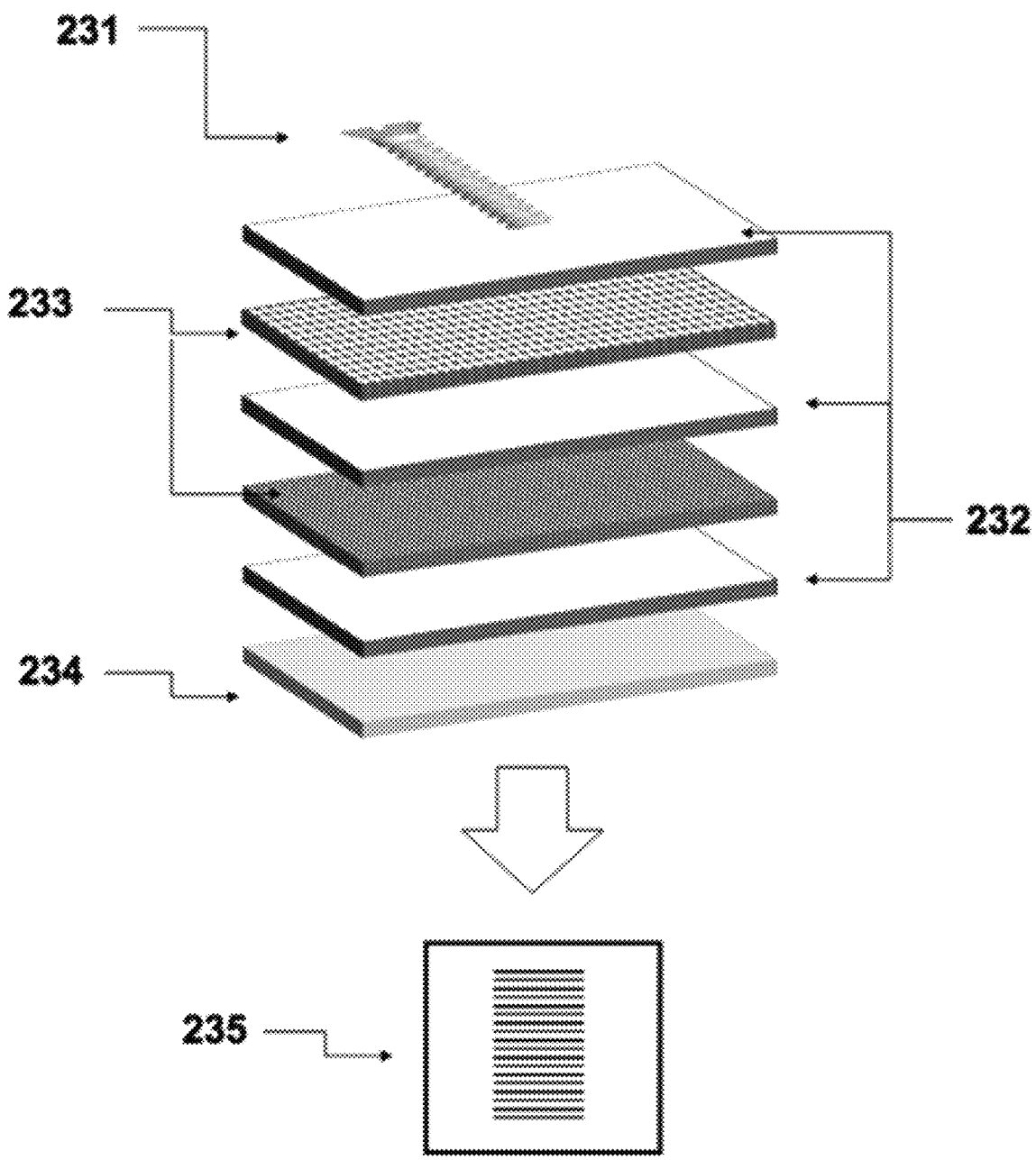
FIG. 23 is a diagram of a portion of an EL device of the invention used to image an object and having multiple phosphor layers sandwiched between dielectric layers on a transparent electrode.

Example 18 with Reference to FIG. 23

Demonstrating the use of more than one EL layer. The result was shown to produce various colors depending on the excitation conditions. In these embodiments, a body 231 is attached to an EL device. The EL device consists of dielectric layers 232 which separate the EL layers 233. The two or more EL layers do not have to be separated, i.e. they can be in direct contact with one another or separated by dielectric layers. The system of the dielectric layers and EL layers are laid above a transparent electrode 234 that is connected by a single wire to a time-varying power supply. Depending on the applied voltage, the observed emission pattern 235 due to local enhancement by the presence of body 231 appears differently. This difference could be in the output color, light intensity, etc. In addition, there could be more than one electrode exciting the EL layer. In an alternative embodiment one of the EL layers shown can be a layer of a fluorescent or phosphorescent material that serves to shift the wavelength of emission from the other layer by radiative or nonradiative energy transfer.

Figure 24:
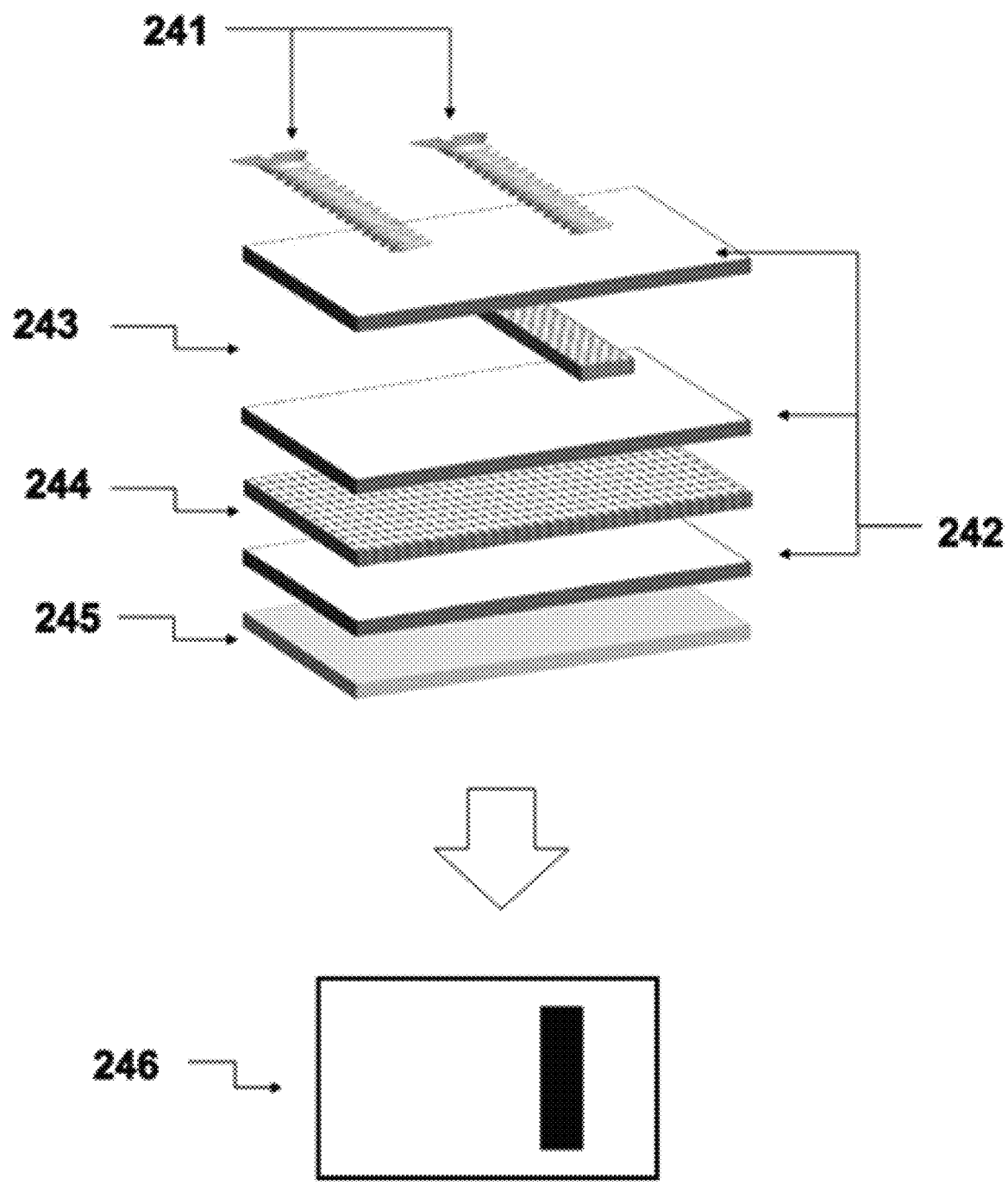
FIG. 24 is a diagram of a portion of an EL device of the invention used to image an object and having a metal nanoparticle layer and phosphor layer sandwiched between dielectric layers on a transparent electrode.

Example 19 with Reference to FIG. 24

Use of metallic nanoparticles or nanostructures (ex. nanotubes) for localized field enhancement: A layer of patterned metal NPs is added between the dielectric layers and the EL layer in order to modify the electric field strength across the EL layer. This allows the electric field to be selectively focused only on a portion of the EL layer for partial and more intense excitation.

In this embodiment, body 241 is connected to an EL device. The EL device contains several layers of dielectric 242. A conductive layer 243 focuses the electric field across the EL layer 244 such that only a portion of the EL layer emits light. Upon excitation of the transparent electrode 245, which is connected to a time-varying power supply by a single wire, only the portion of EL layer coated with the conductive material emits light 246 due to local enhancement by body 241. In further embodiments, by patterning the conductive layer as desired (e.g., pixel, barcode, etc.), a binary output can be enabled.

Figure 25:
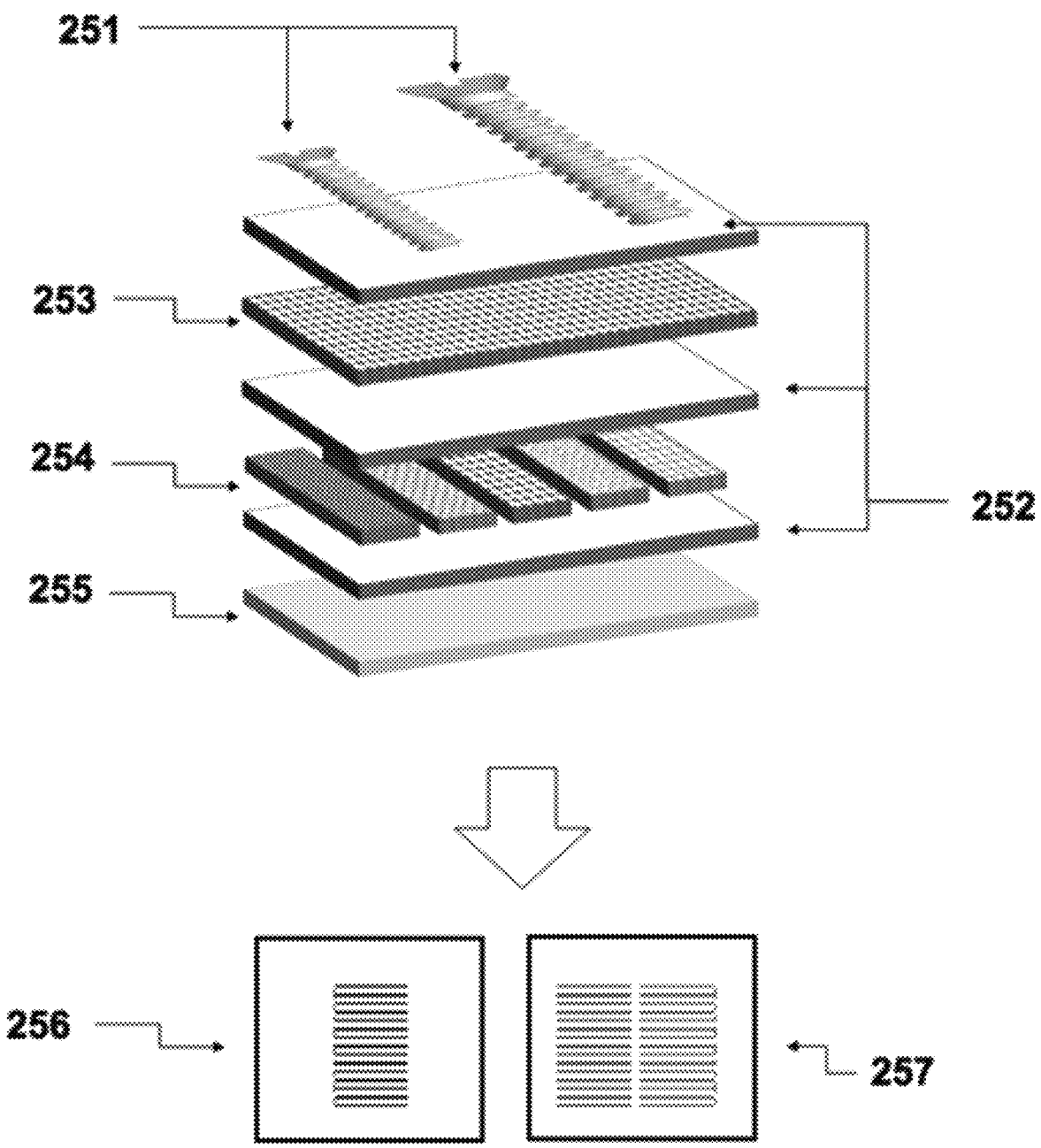
FIG. 25 is a diagram of a portion of an EL device of the invention used to image objects and having a phosphor layer 4 in several segments sandwiched between dielectric layers on a transparent electrode.

Example 20 with Reference to FIG. 25

This example illustrates the use of the present methods to produce a device for imaging objects in discrete picture elements.

In this example, body 251 is attached to an EL device. The EL device consists of several layers of dielectric 252 separating the different EL layers. Various EL layers can be implemented. For instance, one EL layer 253 can uniformly coat the dielectric layer for a uniform output. On the other hand, compartmentalized EL layers 254 can be used to distinguish between bodies of different size and surface area. In the embodiment shown in FIG. 25, the EL layer consists of a substructure (i.e., pixel). The dielectric layers and EL layers sit on top of a transparent electrode 255 that is connected by a single wire to a time-varying power supply. Depending on the size and surface area of body 251, a unique and distinctive pattern 256 or 257 will appear.

Figure 26:
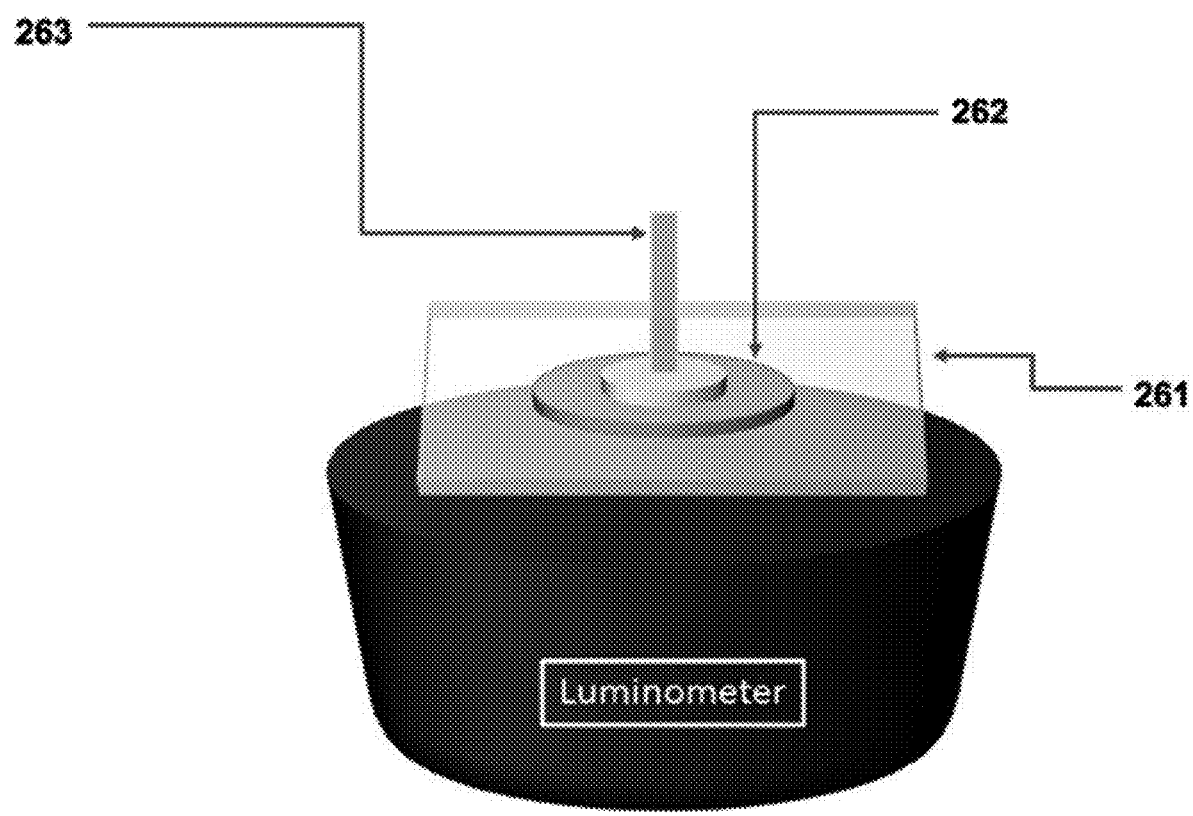
FIG. 26 is a diagram depicting an example embodiment of a system for producing electroluminescence in which a chosen object or body produces differing intensity light by varying the input electrical signal.

Example 21 with Reference to FIG. 26

In another embodiment, the size of the electric field-increasing object (attached to electrode 263) was kept constant while the input electrical energy was varied. The device luminance was measured and plotted as a function of input electrical energy. This method, compliments alternative ground size measurement where the ground size is varied as a function of luminance while the input electrical energy remains constant. In both circumstances, the size of an unknown ground can be derived from the relationship between luminance and the variable input electrical energy or ground size.

In this example, the transparent electrode 261 is directly connected to a time-varying power supply. The mixture of EL layer and the dielectric layer 262 is applied onto the transparent electrode. An electrode 263 is used to connect the material or substance of unknown size (not shown) to the EL layer. The change in luminance due to the change in input electrical energy is recorded by the luminometer. A plot of luminance vs. current will exhibit a curve which can be expressed by a first equation. Repeating the process with different size sample of the same material will yield a family of such curves each expressed by their own characteristic equations. The size or other properties of a test material can therefore be derived. Alternatively, tables can be constructed of luminance vs. size or other properties of interest of the substance or material at different input energies and consulted to calibrate the system with and standardize the results.

The same techniques described in this example can also be applied to identically sized substances of different polarity or dielectric constant thereby deriving characteristic polarity or dielectric constant of an unknown substance or material.

Figure 27:
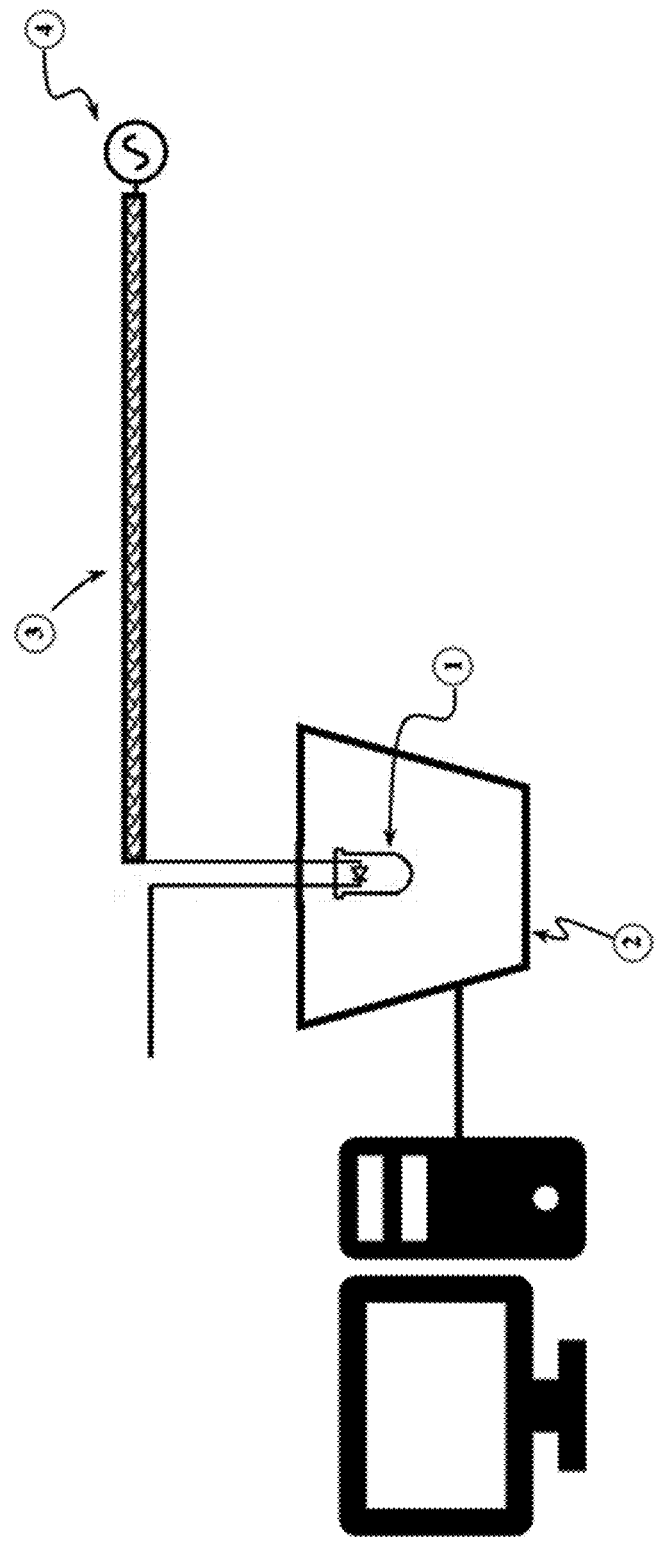
FIG. 27 is a diagram depicting an example embodiment of a system for producing electroluminescence in which a water-filled hose is used to transmit time-varying electrical energy.
Figure 28:
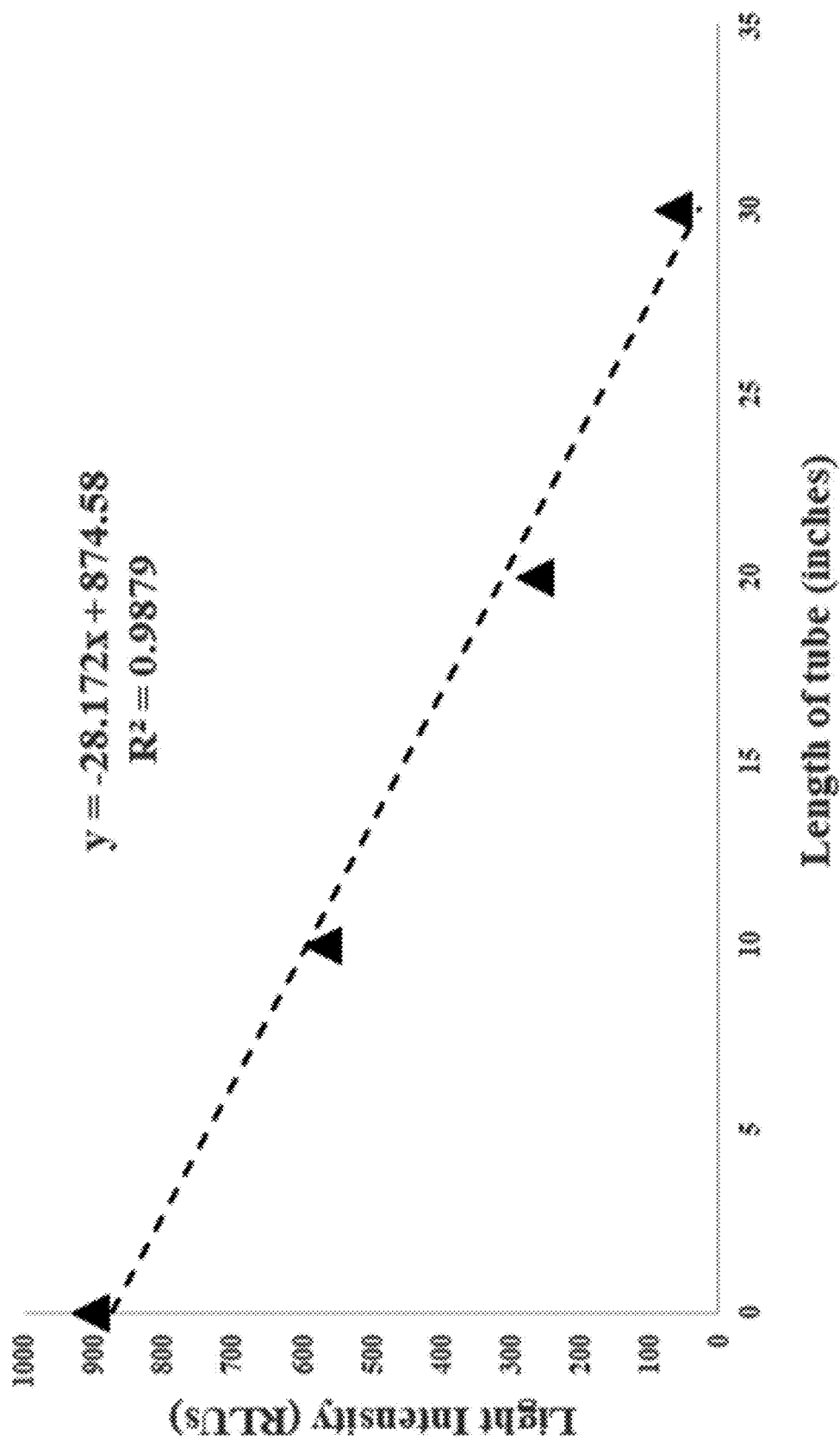
FIG. 28 is a graph showing the variation of light intensity with water-filled hose length using the system of FIG. 27.

Example 22 with Reference to FIGS. 27 and 28

In another example embodiment, the method of present invention was used to measure the effect of the length of the electric field pathway on light intensity. A red LED 271 was used as the electroluminescent device. The LED 271 was placed inside a luminometer 272. One leg of the LED was fixed inside a tube with adjustable length 273 filled with tap water. A single wire from an AC power source 274 was fixed inside the other side of tube 273. The other leg of the LED 271 was not attached to anything, so that the electroluminescent device was at open-circuit. The intensity of the signal with different length of the tube 273 was tested. The intensity of the signal from the LED was recorded in the luminometer, with varying length of the tube. The extracted data show in FIG. 28 that the intensity of the signal from the LED is inversely proportional to the length of the field pathway.

The foregoing description of the embodiments has been provided for purposes of illustration and description. It is not intended to be exhaustive or limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be viewed as a departure from the disclosure, and all such modifications are intended to be included within the scope of the disclosure.

What is claimed is:

1. A method for measuring a property of an object comprising:
   transmitting a time-varying electrical signal from a power source through a single electrical terminal to an electroluminescent device, wherein the electroluminescent device remains at open circuit;
   positioning the object in close proximity to the electroluminescent device while the time-varying electrical signal is transmitted to the electroluminescent device, such that the object increases an amplitude of the time-varying electrical signal across the electroluminescent device and thereby emits light from the electroluminescent device;
   measuring an intensity of the light emitted from the electroluminescent device; and
   relating the measured intensity of the light emitted from the electroluminescent device to the property of the object.

2. The method of claim 1 further comprising measuring the intensity of the light emitted from the electroluminescent device and relating the measured intensity of the light emitted from the electroluminescent device to at least one of a presence, a position and a quantity of the object.

3. The method of claim 1 wherein the property is selected from a group consisting of volume, mass, area, length, distance, concentration in a solution, pH, ionic strength, ratio of two substances in admixture, polarity, conductivity, capacitance, and temperature.

4. The method of claim 1 wherein the object is a reaction solution containing a soluble reaction product and the light emitted from the electroluminescent device is related to an amount of the soluble reaction product.

5. The method of claim 4 wherein the reaction solution comprises an enzyme and an enzyme substrate that react together to produce the soluble reaction product.

6. The method of claim 1 wherein the object is a mixture of two liquids and the light emitted from the electroluminescent device is related to a ratio of the amounts of the two liquids.

7. The method of claim 1 wherein the electroluminescent device is at least one LED.

8. The method of claim 7 comprising using a multiplicity of LEDs.

9. The method of claim 8 wherein more than one color of LED is used.

10. The method of claim 1 wherein the electroluminescent device comprises a transparent electrode and a phosphor material layer deposited on a surface of the transparent electrode.

11. The method of claim 10 wherein the transparent electrode is a planar electrode.

12. The method of claim 11 wherein the phosphor material layer covers a discrete region of a surface of the planar electrode.

13. The method of claim 11 wherein the phosphor material layer covers a plurality of discrete regions of a surface of the planar electrode.

14. The method of claim 13 wherein a plurality of different phosphor materials is used and wherein each of the plurality of discrete regions is covered with a single phosphor material and wherein each of the plurality of different phosphor materials emits light of a different color.

15. The method of claim 11 wherein the phosphor material layer is selected from a group consisting of semiconductor particles, doped semiconductor particles, quantum dots, fluorescent monomers, fluorescent oligomers, fluorescent polymers, phosphorescent monomers, phosphorescent oligomers, phosphorescent polymers, and mixtures thereof.

16. The method of claim 11 wherein the electroluminescent device further comprises a dielectric coating over a surface of the phosphor material layer opposite the transparent electrode.

17. The method of claim 11 wherein the electroluminescent device further comprises a dielectric coating between the transparent electrode and the phosphor material layer.

18. The method of claim 11 wherein the electroluminescent device further comprises a first dielectric coating between the transparent electrode and the phosphor material layer and a second dielectric coating over a surface of the phosphor material layer opposite the transparent electrode.

19. The method of claim 11 wherein the phosphor material layer is embedded in a dielectric coating.

20. The method of claim 7 wherein the LED comprises a light emitting element connected to two electrical leads and wherein at least one of the two electrical leads is coated with a dielectric material.

21. The method of claim 1 wherein the time-varying electrical signal is transmitted from the power source to the electroluminescent device by a single transmitting conductor.

22. The method of claim 21 wherein the single transmitting conductor is a conductive lead.

23. The method of claim 21 wherein the single transmitting conductor is a fluid.

24. The method of claim 1 wherein the object is a part of a body.

25. The method of claim 24 wherein the part of the body is a human fingertip.

26. The method of claim 24 wherein the part of the body is a tissue section.

27. The method of claim 1 wherein the object comprises a liquid.

28. The method of claim 27 wherein the liquid comprises an aqueous solution having at least one solute.

29. The method of claim 28 wherein the at least one solute is selected from a group consisting of acids, bases, inorganic salts, organic salts, water-soluble organic solvents, water-soluble polymers, amino acids, peptides, proteins, enzymes, enzyme substrates, nucleotides, nucleosides, nucleic acids, and mixtures thereof.

30. The method of claim 27 wherein the liquid is contained in a vessel that contacts the electroluminescent device.

31. The method of claim 28 wherein light intensity generated by the electroluminescent device is proportional to a concentration of the at least one solute in the aqueous solution.

32. The method of claim 1 wherein the time-varying electrical signal is alternating current having a frequency in the range of 1 Hz to 200 kHz.

33. The method of claim 1 wherein the time-varying electrical signal has a waveform selected from a group consisting of sinusoidal, square, sawtooth, and pulsed waveforms.

34. A method for measuring a property of a fluid comprising:
transmitting a time-varying electrical signal from a power source through a single electrical terminal to an electroluminescent device through the fluid, wherein the electroluminescent device remains at open-circuit;
positioning an object in close proximity to the electroluminescent device while the time-varying electrical signal is transmitted to the electroluminescent device, such that the object increases an amplitude of the time-varying electrical signal across the electroluminescent device and thereby emits light from the electroluminescent device;
measuring an intensity of the light emitted from the electroluminescent device; and
relating the measured intensity of the light emitted from the electroluminescent device to the property of the fluid.

35. The method of claim 34 wherein the property is selected from a group consisting of mass, volume, conductivity, dielectric constant, polarity, concentration of a solute, and pH.

36. The method of claim 34 wherein light intensity generated by the electroluminescent device is proportional to a dielectric constant of the fluid.

37. The method of claim 34 wherein light intensity generated by the electroluminescent device is proportional to a volume of the fluid.

38. The method of claim 34 wherein the fluid is contained in a tube of fixed cross section and length and wherein the measured intensity of the light emitted from the electroluminescent device is proportional to the length of the tube.

39. The method of claim 38 wherein the fluid is positioned between the electroluminescent device and the power source.

40. The method of claim 34 wherein the fluid surrounds the electroluminescent device.

* * * * *